United States Patent
Prempraneerach et al.

(10) Patent No.: US 7,020,329 B2
(45) Date of Patent: Mar. 28, 2006

(54) COLOR IMAGE SEGMENTATION IN AN OBJECT RECOGNITION SYSTEM

(75) Inventors: Pradya Prempraneerach, Somerville, MA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 739 days.

(21) Appl. No.: 10/231,968

(22) Filed: Aug. 30, 2002

(65) Prior Publication Data

US 2003/0044061 A1    Mar. 6, 2003

Related U.S. Application Data

(60) Provisional application No. 60/316,948, filed on Aug. 31, 2001.

(51) Int. Cl.
*G06K 9/00* (2006.01)

(52) U.S. Cl. ........................ 382/164; 382/168

(58) Field of Classification Search ............... 382/154, 382/159, 164, 168, 173, 181, 224, 225, 232, 382/254, 260, 264, 285; 358/515, 520, 522, 358/523; 345/589, 600
See application file for complete search history.

(56) References Cited

U.S. PATENT DOCUMENTS

| | | | |
|---|---|---|---|
| 4,731,863 A | | 3/1988 | Sezan et al. |
| 5,432,893 A | * | 7/1995 | Blasubramanian et al. . 345/600 |
| 5,764,824 A | | 6/1998 | Kurtzberg et al. |
| 5,825,909 A | | 10/1998 | Jang |
| 5,848,185 A | * | 12/1998 | Koga et al. .................. 382/173 |
| 5,933,524 A | * | 8/1999 | Schuster et al. ............. 382/168 |
| 6,009,200 A | * | 12/1999 | Fujita et al. ................. 382/232 |
| 6,108,446 A | | 8/2000 | Hoshen |
| 6,178,260 B1 | | 1/2001 | Li et al. |
| 6,182,069 B1 | * | 1/2001 | Niblack et al. ................. 707/6 |
| 6,760,488 B1 | * | 7/2004 | Moura et al. ................ 382/285 |
| 6,788,809 B1 | * | 9/2004 | Grzeszczuk et al. ........ 382/154 |
| 2003/0044061 A1 | * | 3/2003 | Prempraneerach et al. . 382/164 |

OTHER PUBLICATIONS

International Search Report of PCT Appl. No. PCT/US02/27705 mailed Oct. 21, 2002.

R. Schettini, "Low-Level Segmentation of Complex Color Images," *Signal Processing VI Theories and Applications*, © 1992 Elsevier Science Publishers B.V., Aug. 24, 1992, pp. 535-538.

Mehmet Celenk, A Color Clustering Technique for Image Segmentation, 2435 *Computer Vision, Graphics, and Image Processing*, 52 (1990) Nov., No. 2, Duluth, MN, US, Nov. 1, 1990, pp. 145-170.

(Continued)

*Primary Examiner*—Andrew W. Johns
*Assistant Examiner*—Amir Alavi
(74) *Attorney, Agent, or Firm*—Daly, Crowley, Mofford & Durkee, LLP

(57) ABSTRACT

A method for segmenting a color image into a plurality of regions includes converting the image to a three-dimensional color space, generating a histogram for each dimension in the color space, using the histogram for each dimension to generate a plurality of connecting-boxes in the three-dimensional color space, and computing a normalized variance value of each connecting-box in order to form clusters of connecting-boxes corresponding to regions of the image. An illustrated application for the image segmentation method is in an object recognition system suitable for aligning a probe of an atomic force microscope with a feature of a sample.

18 Claims, 26 Drawing Sheets

OTHER PUBLICATIONS

Shoji Tominaga, A Color Classification Method for Color Images Using a Uniform Color Space, *IEEE*, © 1990, Jun. 16, 1990, pp. 803-807.

K. Uchimura, "Color Images Segmentation Using Tree Representation" T.IEE Japan, vol. 114-C, No. 12, 1994, pp. 1320-1321.

L. Shafarenko, M. Petrou, and J. Kittler, "Histogram-Based Segmentation in a Perceptually Uniform Color Space," IEEE Transactions On Image Processing, vol. 7, No. 9, pp. 1354-1358, Sep. 1998.

C. Zhang and P. Wang, "A New Method of Color Image Segmentation Based on Intensity and Hue Clustering," IEEE, International Conference on Pattern Recognition (ICPR'00)—vol. 3, Sep. 3-8, 2000, Barcelona, Spain.

E.K. Wong and M. Chen, "A Robust Algorithm for Text Extraction in Color Video," IEEE International Conference on Multimedia and Expo (II) 2000; 797-799.

J. Matas, R. Marik, and J. Kittler, "The Color Adjacency Graph Representation of Multi-Coloured Objects", Technical Report VSSP-TR-Jan. 1995, pp. 1-17, University of Surrey, Guildford, GU2 5XH, UK.

D. Park, J. Park, T. Y. Kim and J. H. Han, "Image Indexing using Weighted Color Histogram," *ICIAP*, pp. 909-914, 1999, A. I. T. Yongin, Korea, ETRI, Taejon, Korea, POSTECH, Pohang, Korea.

S. H. Park, I. D. Yun and S. U. Lee, "Color Image Segmentation Based on 3-D Clustering: Morphological Approach," *Pattern Recognition*, vol. 31, No. 8, pp. 1061-1076, 1998, © 1998 Pattern Recognition Society, Published by Elsevier Science Ltd.

A. Khotanzad and A. Bouarfa, "A Parallel, Non-Parametric, Non-Interactive Clustering Algorithm With Application To Image Segmentation," Southern Methodist University, Dallas, Texas 75276, © 1988 Maple Press, pp 305-309.

A. Khotanzad and O. J. Hernandez, "Color Image Retrieval Using Multispectral Random Field Texture Models," IEEE Signal Processing Society Ninth DSP (DSP 2000) Workshop, Oct. 15-18, 2000.

\* cited by examiner

COLOR IMAGE SEGMENTATION IN AN OBJECT RECOGNITION SYSTEM

CROSS-REFERENCE TO RELATED APPLICATIONS

This application claims priority under 35 U.S.C. §119(e) to U.S. Provisional Application No. 60/316,948, filed on Aug. 31, 2001 and which is hereby incorporated herein by reference in its entirety.

STATEMENTS REGARDING FEDERALLY SPONSORED RESEARCH

Not applicable.

FIELD OF THE INVENTION

This invention relates generally to color image processing and more particularly to systems and techniques for segmenting color images in an object recognition system.

BACKGROUND OF THE INVENTION

The basic objective of an object recognition system is the identification of objects within an image. One object recognition technique involves segmentation and classification. Segmentation refers to a method by which an image is partitioned into independent regions corresponding to portions of objects of interest, which portions have uniform characteristics. Once segmented, these regions are used in a classification process to identify each object in the image.

Often, the images to be processed are color images and, since the color characteristics provide additional information about objects in the images, it is advantageous to segment the images based on common color characteristics. Color characteristics are often represented by values in standardized multi-dimensional color spaces and the images can be provided by high-resolution sensors containing millions of pixels. Because of the complexity of the color space and the quantity of pixels to process, the amount of processing required to segment a high-resolution color image can limit the utility of color image processing.

Conventional segmentation methods use known region-based, edge-based, physical model-based and pixel-based segmentation techniques. Region-based segmentation techniques require prior information about the objects in the image and iterative processes which require relatively large computational resources. Further, such iterative operations are not generally suitable for use in real time applications, such as real time probe alignment in an atomic force microscope.

Edge-based segmentation techniques involve computation of the edge features of the image and assignment of vectors to these features. Segmentation is achieved by clustering edge vectors to form closed-contour regions. The edges are calculated from gradients in specific areas of the image. A difficulty of edge-based segmentation techniques is obtaining closed and connected contours of each object, since the edges often fragment in the image as the result of image variation. In natural scenes, image variations arise from shadows, changes in lighting, color fading and also from artifacts in the imaging equipment.

Physical model-based segmentation methods utilize elementary physical models of the color image formation to produce color variations. However, with these methods, segmented regions do not follow an object's boundaries and segmented perimeters. The boundaries and perimeters instead follow the variation in lighting and color and the models yield accurate segmentation results only in restricted viewing environments, e.g., a controlled environment having controlled lighting and uniform backgrounds.

Pixel-based segmentation methods use gray-scale or color information from each pixel to group the pixels into classes for labeling objects in the image. There are various ways to classify each pixel including histogram-based classification, distance-based pixel classification and maximum likelihood pixel classification. These techniques use only the global information described in an image's feature space, such as the color distribution of the entire image, to classify each pixel in the original image and advantageously, do not require a priori information about the image.

Segmentation further includes clustering by which samples, in the form of pixels in the original image, are grouped into distinct classes. In some conventional histogram-based segmentation methods, clustering involves specifying cluster boundaries (i.e. a volume of pixels in three-dimensional space). Clustering often involves significant iterative computation if several of the clusters are distant from each other in the color space. Other conventional histogram-based segmentation methods use non-iterative clustering algorithms, but require partitioning the image into a multidimensional feature space. The multidimensional feature space is divided into equally spaced volumes referred to as hyper-boxes which include estimated parameters from random field models and other local statistics.

SUMMARY OF THE INVENTION

In accordance with the present invention, a method for segmenting a color image into a plurality of regions includes converting the image to a three-dimensional color space, generating a histogram for each dimension in the color space, using the histogram for each dimension to generate a plurality of connecting-boxes in the three-dimensional color space, and computing a normalized variance value of each connecting-box in order to form clusters of connecting-boxes. The clusters are labeled and each pixel in the image is associated with a cluster to complete processing in the image space.

With such a technique, an efficient method for segmenting color images into regions without iterative clustering steps is provided. Additionally, all color information from each pixel is processed only once for conversions of the three histograms without iterative steps, further reducing computational time.

In accordance with a further aspect of the present invention, the method includes detecting a valley in each histogram and associating each connecting-box with a respective valley in the histograms, in order to provide coarse segmentation. With such a technique, a clustering process following the steepest gradient direction of the connecting-box structure can be performed to refine the segmentation without requiring iterative processes.

In one embodiment, the color image is of an atomic force microscope probe and a sample. The method further includes classifying the clusters of connecting-boxes to identify objects comprising the probe and the sample and detecting a position of the probe relative to the sample for purposes of automatic atomic force microscope probe alignment.

Advantageously, the methods and apparatus of the invention operate substantially faster than other methods using iterative clustering techniques. The invention is suitable for use in a variety of object recognition systems.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Before providing a detailed description of the invention, it may be helpful to define some of the terms used in the description. The term "connecting-box" refers to a structure in a three-dimensional color space formed by projecting a valley point of a histogram into the three-dimensional color space. A "connecting-box structure" results from projecting valleys of each of the three histograms for the three-dimensional color space into the color space. When used in conjunction with a clustering process, the connecting-boxes are interchangeably also referred to as "connecting nodes" or simply "nodes." Each connecting-box includes a set of sampled data points or pixels from an image which are mapped into the color space. The color space includes differing numbers of connecting-boxes as a function of the color image being processed. The connecting-boxes have varying volumes in the color space and can include different numbers of pixels. The connecting-boxes are separated in the color space by volumes of varying size which do not contain any pixels.

Figure 1:
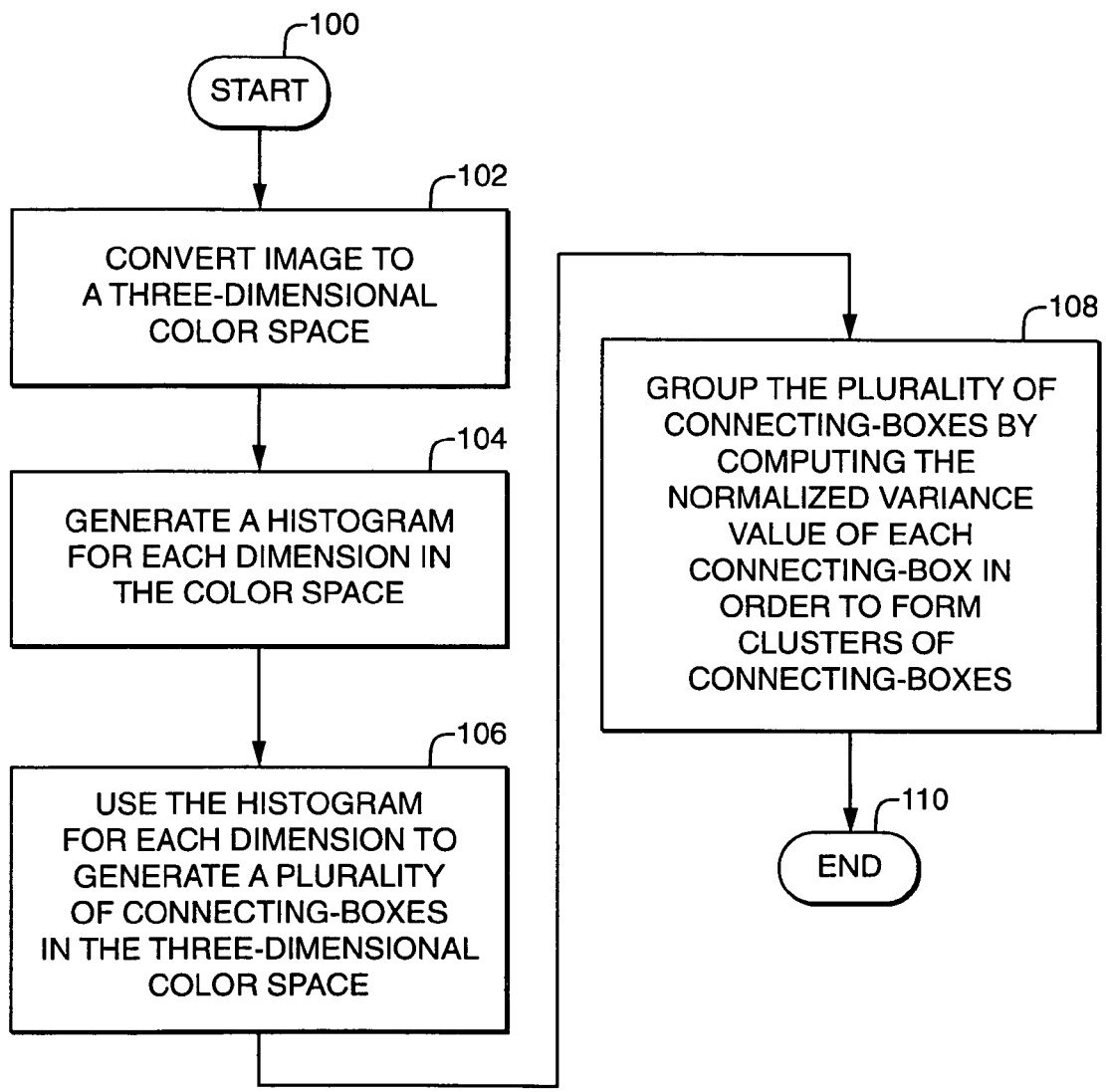
FIG. 1 is a flow diagram illustrating a process for segmenting a color image according to the invention.

Referring to FIG. 1, a flow diagram illustrates a process for segmenting a color image using color characteristics. In the flow diagrams contained herein, the rectangular elements are "processing blocks" (typified by element 102 in FIG. 1) and represent computer software instructions or groups of instructions. Alternatively, the processing blocks represent steps performed by functionally equivalent circuits such as a digital signal processor (DSP) circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated, the particular sequence of steps described is illustrative only and can be varied without departing from the spirit of the invention.

The process commences in step 100, following which the color image is converted into a three-dimensional color space. In step 104, a histogram is generated for each dimension in the color space. The histogram for each dimension is used in step 106 to generate a plurality of connecting-boxes in the same three-dimensional color space. In step 108, the connecting-boxes are grouped without iterative processing, by computing a normalized variance value of each connecting-box in order to form clusters of connecting-boxes, following which the process ends at step 110. It should be noted that each cluster contains pixels having uniform color space characteristics and not necessarily to objects having related spatial properties, i.e. pixels located together in the image.

Figure 2:
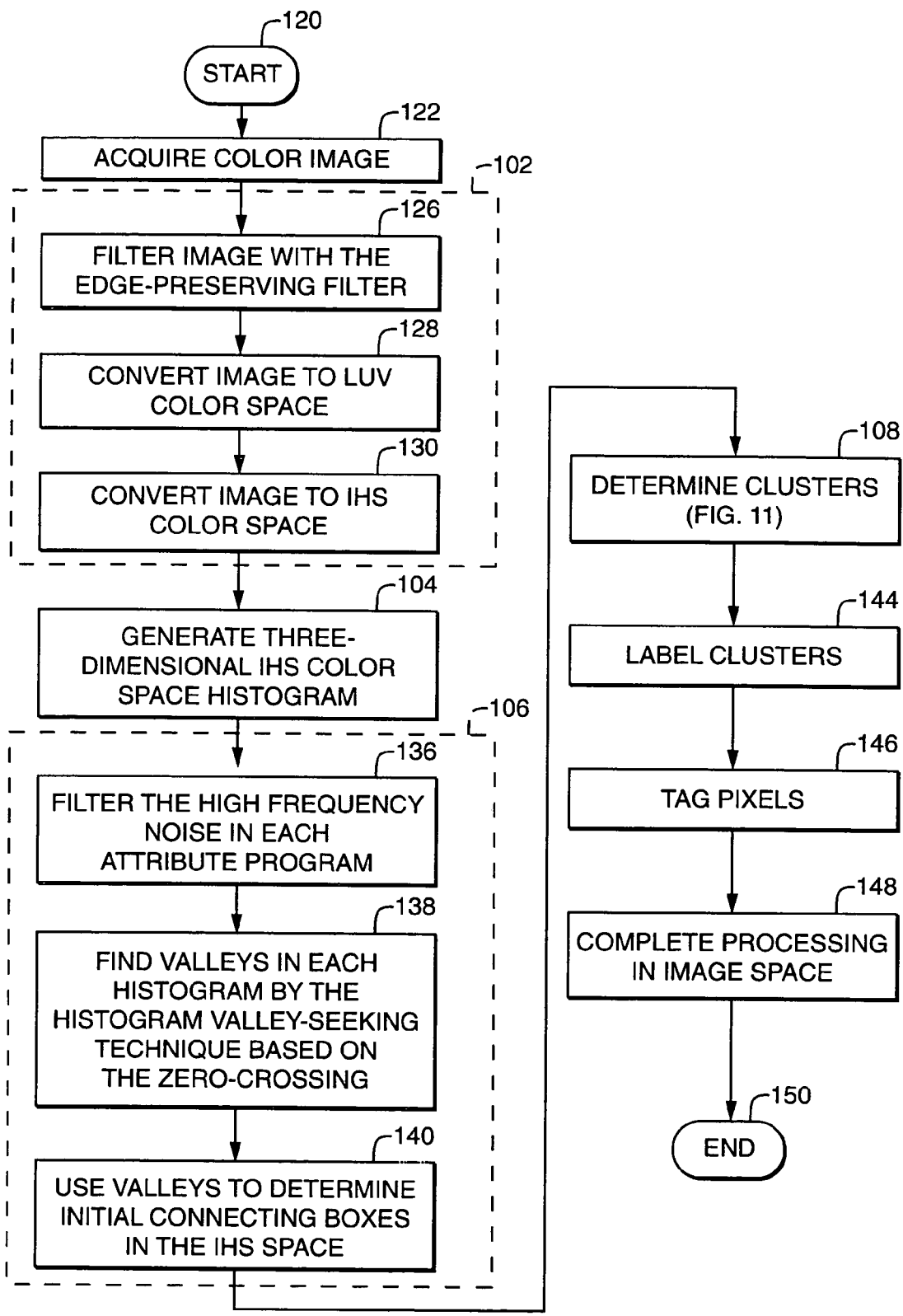
FIG. 2 is a more detailed flow diagram of the method of FIG. 1.

Referring also to FIG. 2, in which like reference designations refer to like steps, a flow diagram illustrates further details of the method of FIG. 1. The process commences in step 120, following which a color image is acquired in step 122. The color image is provided by a color image source of the type including, but not limited to a color sensor, such as color video camera, a color still camera or a color image database. The color image can also be generated synthetically using known digital image processing techniques. These images are often input as red, green and blue (RGB) pixel values.

Steps 126, 128 and 130 correspond, collectively, to step 102 of FIG. 1 in which the image is converted to a three-dimensional color space. Here, the RGB image is converted to the IHS space which separates the chromatic values, hue and saturation, from the achromatic value, intensity. The major benefits of IHS color space over other color spaces, when used for image segmentation, are compatibility with human perception and separability of chromatic values from achromatic values in a manner similar to the "opponent" color space used in the television industry.

In step 126, the image is filtered with an edge-preserving filter which serves to smooth the color image, thereby reducing discontinuities in the histograms derived in step 104. Edge-preserving filters with these properties are described in M. Nitzberg, D. Mumford and T. Shiota, "Filtering, Segmentation and Depth," Lecture Notes in Computer Science, Springer-Verlag, Berlin Heidelberg, 1993. In one embodiment, adaptive smoothing using known blurring/sharpening algorithms that enhance strong edges, eliminate noise and weak edges, and preserve corners and T-junctions are applied to smooth out the image. In one embodiment, the image is filtered with a two-dimensional gaussian kernel which is displaced according to the local gradient. Because conversion from RGB space to IHS space is a nonlinear transformation, a small quantity of noise in RGB space is highly amplified by the color space transformation. Thus, in the case of a noisy image, the filtering step smoothes out the RGB color space before color space transformation steps 128 and 130. Illustrative image noise sources include poor lighting conditions and noise introduced in the image acquisition process.

In step 128, the filtered image is converted to the Commission Internationale de l'Eclairage (CIE) CIELUV color space (commonly referred to as the LUV color space). The LUV color space is used because its color difference is highly correlated with human color recognition and can be expressed in Euclidean coordinates, i.e. equal distances in the LUV space approximately represent equal color differences. Details of the known conversion process into the LUV color space can be found in, S. J. Sangwine and R. E. N. Horne, "The Colour Image Processing Handbook," Chapman & Hall, 1$^{st}$ edition, 1998, pages 44–47. Additionally, converting from RGB directly to IHS color space causes perceptual non-uniformity. The RGB image is converted to LUV space pixel by pixel, using the following equations:

$$X=0.430\ R+0.342\ G+0.178\ B \quad (1)$$

$$Y=0.222\ R+0.707\ G+0.071\ B \quad (2)$$

$$Z=0.020\ R+0.130\ G+0.939\ B \quad (3)$$

$$u=4\ X/(X+9\ Y+3\ Z) \quad (4)$$

$$v=9\ Y/(X+9\ Y+3\ Z) \quad (5)$$

$$L^*=116 f(Y/Y_0)-16 \quad (6)$$

$$u^*=13\ L^*(u-u_0) \quad (7)$$

$$v^*=13\ L^*(v-v_0) \quad (8)$$

Where X, Y and Z are intermediate variables;
Value $L^*$ represents lightness or intensity;
value $u^*$ represents the Redness/Greenness axis;
value $v^*$ represents the yellowness/blueness axis;
$f(x)=x^{1/3}$ if $x>0.008856$
or $7.87x+(16/116)$ if $x<=0.008856$; and
$u_0$ and $v_0$ are the u, v coordinates of a specific white reference respectively.

The use of a white reference is described in S. J. Sangwine and R. E. N. Horne, "The Colour Image Processing Handbook," pages 45–46.

In step 130, the LUV color space representation of the image is transformed, pixel by pixel, into the IHS color space using the following equations:

$$H_{uv^*}=\tan^{-1}(v^*/u^*) \quad (9)$$

$$S_{uv^*}=sqrt(u^{*2}+v^{*2}) \quad (10)$$

$$I_{uv^*}=L^* \quad (11)$$

In step 104, a histogram is generated for each of the I, H and S components in the IHS color space which permit independent examination of the distribution of each color attribute. The histograms are generated by providing a bin for each value for each of the I, H and S components within a predetermined range of values. A pixel is placed into one of the bins for each component. For example, consider a pixel having component values of 90 in intensity, 100 in hue and 125 in saturation. The $bin_{90}$ corresponding to a value of 90 in the intensity histogram is incremented by one, as are $bin_{100}$ in the hue histogram and $bin_{125}$ in the saturation histogram. The histograms are completed by processing every pixel in the image in a similar manner. The accuracy of the results of the histogram-based segmentation depends on how well the objects of interest separate into distinct ranges or intervals in each dimension. In one embodiment, each pixel has a range of 0–256 in intensity value, 0–300 in hue and 0–200 in saturation. The color attribute values are normalized to fall within predetermined ranges. In one embodiment, each range is determined experimentally such that the range of values yields a distribution which optimizes the segmentation process.

Figure 5:
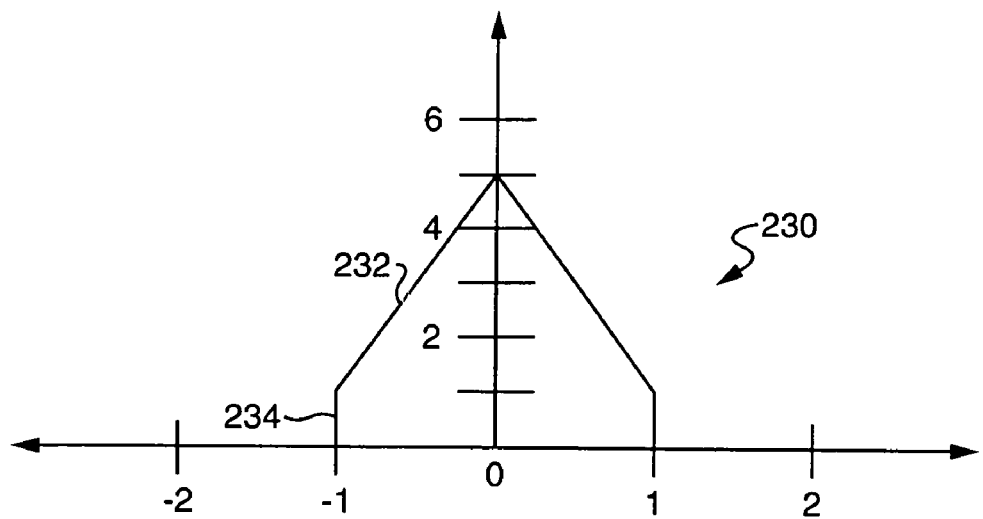
FIG. 5 is a structuring element used in an opening-closing filtering operation according to the invention.

Steps 136, 138 and 140 correspond collectively, to step 106 of FIG. 1 in which each of the three histograms of the image is used to generate a plurality of connecting-boxes. In step 136, the high frequency noise in each histogram is filtered. Each histogram is composed of a slowly varying signal buried within high frequency signal and noise components due to the discrete approximation of the density function of each dimension in the color space. As will be described, morphological filters using a structuring element are used to reduce the high-frequency signal and noise components in each of the I, H and S histograms with opening and closing operations. In one embodiment, the structuring element used for filtering the histograms is a raised triangle 230 (FIG. 5).

In step 138, the valley of each histogram is found by a valley-seeking technique based on the zero-crossings in each of the I, H and S histograms. As will be described in conjunction with FIGS. 3–3C and 4–4C, typical images result in noisy histograms with which the pixels cannot be accurately segmented using simple conventional thresholding methods. The valley-seeking technique of step 138 in combination with the histogram filtering of step 136 permits more accurate segmentation.

In step 140, each of the valleys in each of the I, H and S histograms is used to determine the connecting-boxes in the IHS space. More particularly, each valley is projected into the three-dimensional color space as described below in conjunction with FIGS. 9 and 9A.

Figure 11:
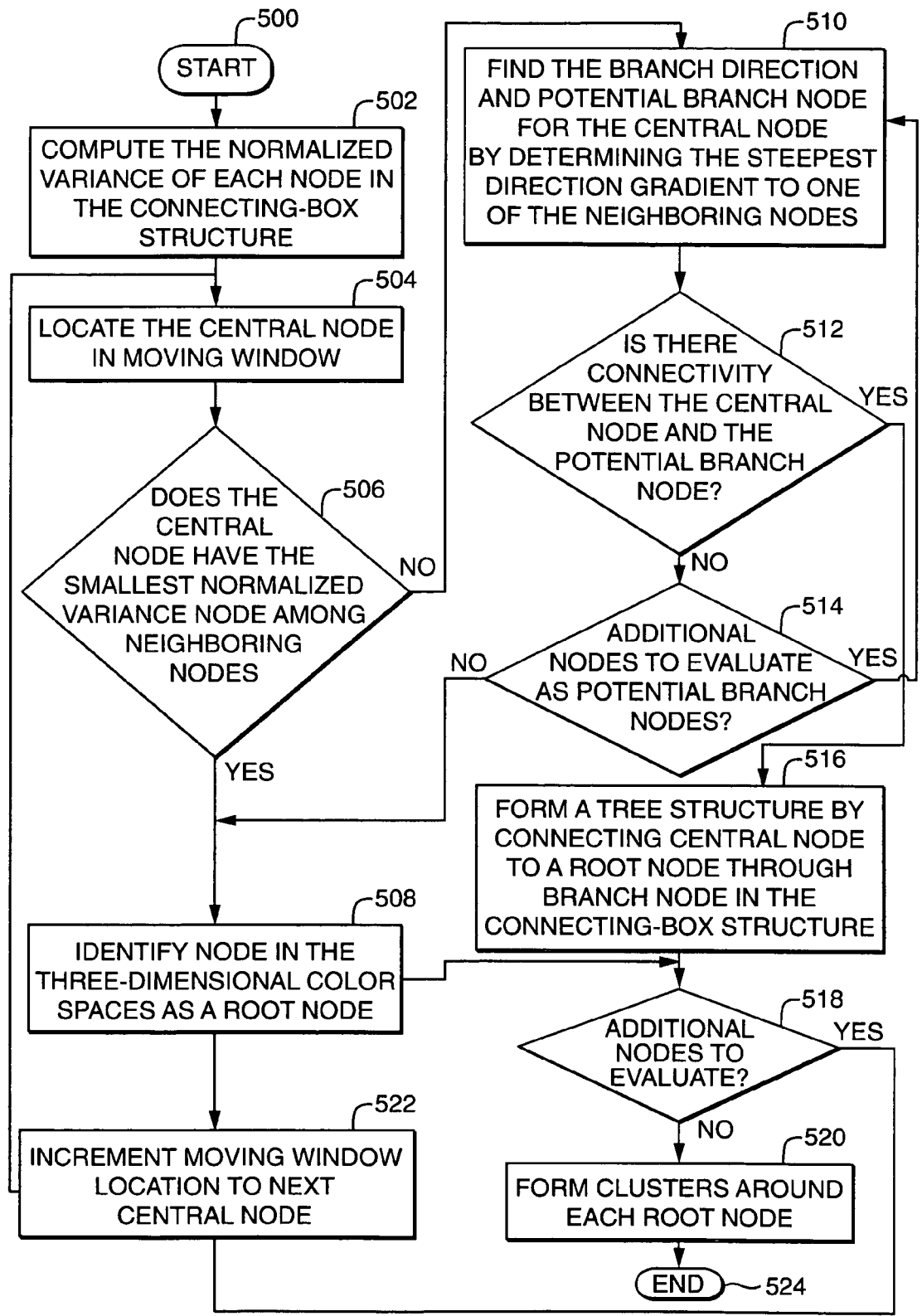
FIG. 11 is a flow diagram illustrating the steps to cluster pixels in a three-dimensional color space.

In step 108, clusters of connecting-boxes are formed, as described in conjunction with FIG. 11. In step 144, each of the clusters is labeled with a unique identifying label. In step 146, each pixel is tagged as being associated with a cluster as a function of the pixel's intensity, hue and saturation values. Each pixel can be tagged, for example, by associating a cluster number with each pixel, forming a list of each cluster's pixels, or associating spatial regions of pixels within the same cluster with the corresponding cluster. Finally, in step 148, the segmented and clustered pixels are further processed by a classification process, to detect objects of interest as described below in conjunction with FIG. 15.

Figure 3:
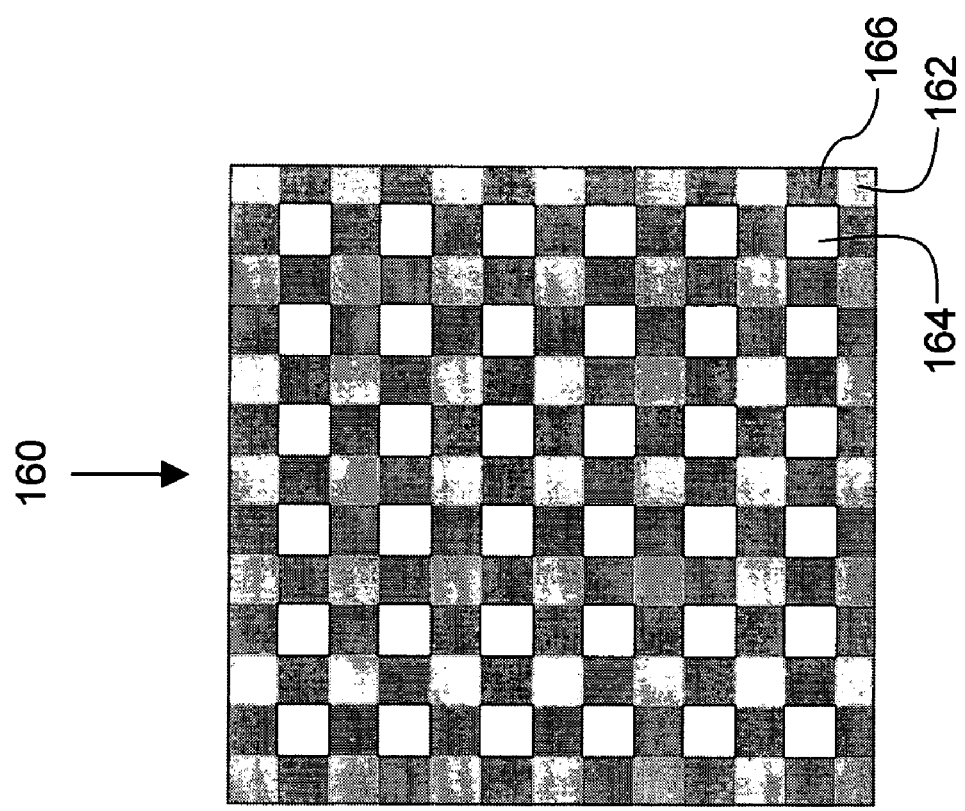
FIG. 3 is a simple image useful in describing the histograms for an image in three-dimensional color space.
Figure 3A:
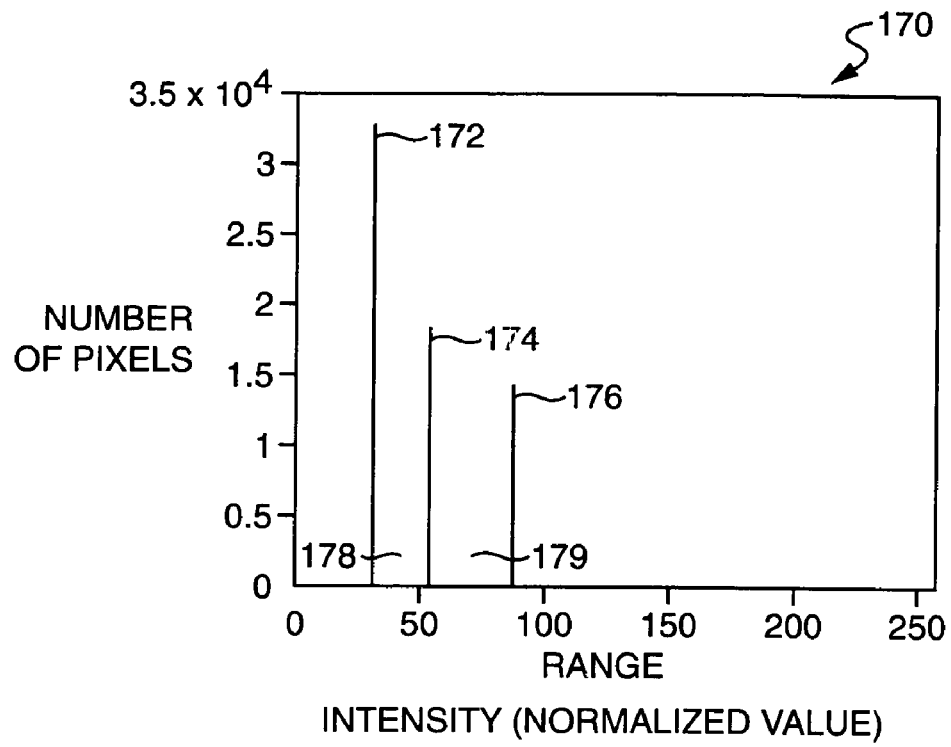
FIGS. 3A, 3B and 3C are the intensity, hue, and saturation (IHS) histograms of the image of FIG. 3 respectively.
Figure 3B:
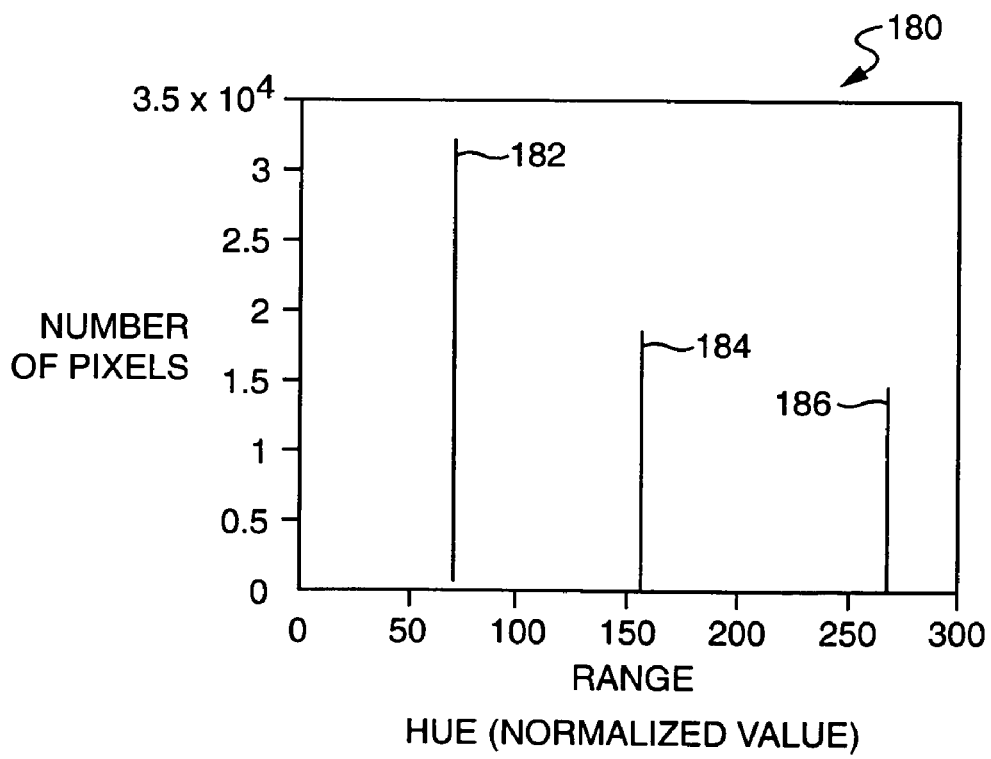
Figure 3C:
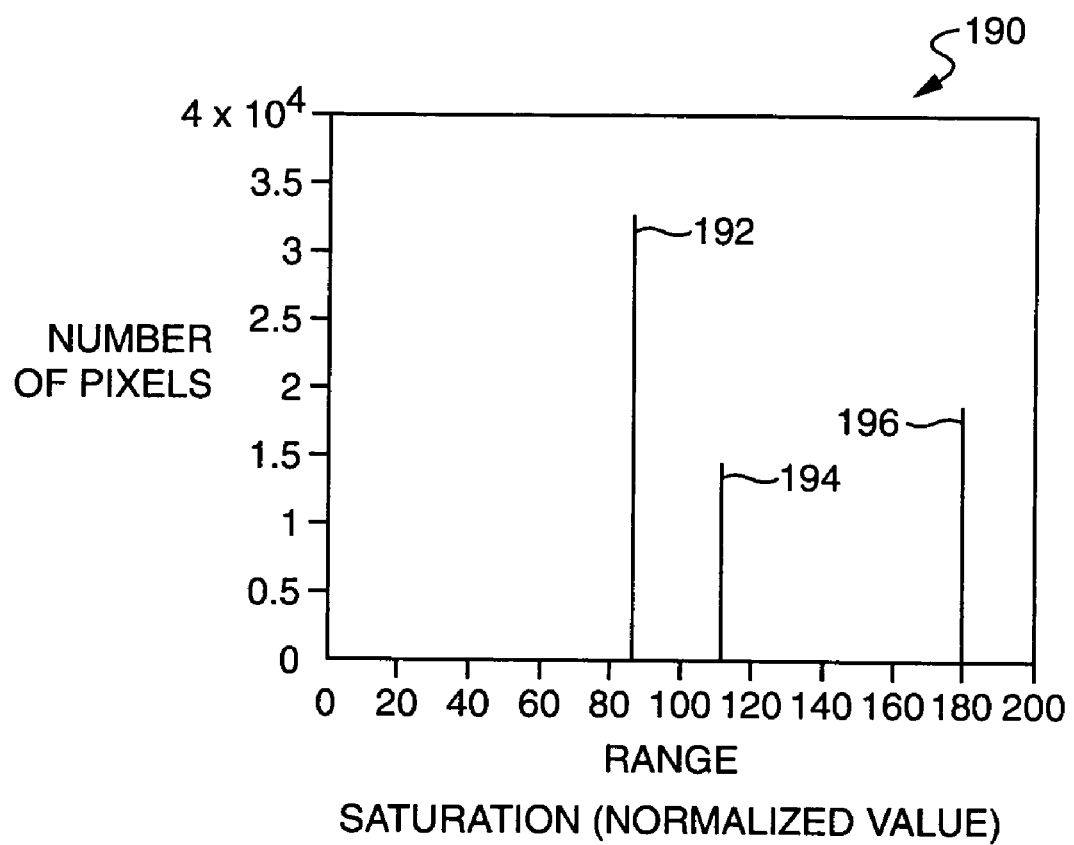
Figure 4:
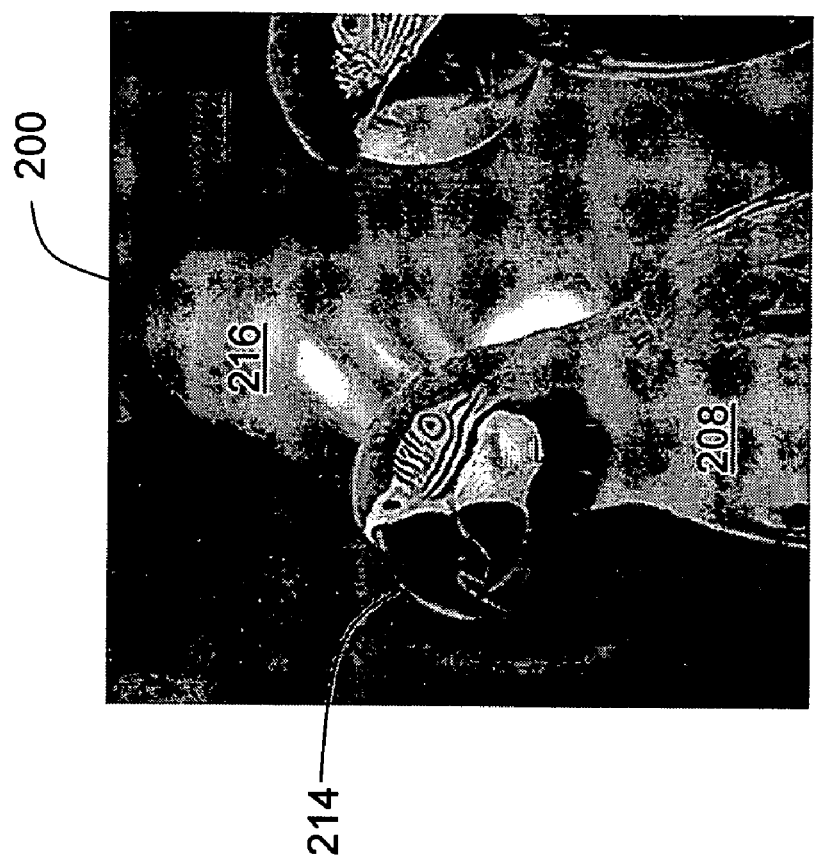
FIG. 4 is a natural scene image useful in further describing histograms for each dimension in three-dimensional color space.

Referring to FIGS. 3 and 4, advantages of the filtering step 136 and valley-seeking step 138 will become apparent by considering illustrative images 160 and 200 respectively. Referring to FIG. 3, a synthetic cross image 160 is shown. The image 160 includes regions containing only three distinct colors, red 162, green 164 and blue 166 in an RGB color space. In this example, the original image size is 256 by 256 pixels and the image includes 18496 red pixels, 14400 green pixels and 32640 blue pixels. Each pixel in the image 160 is converted from an RGB value to an LUV value and then to an IHS value according to equations 1–11 above. For each component, intensity, hue and saturation, a histogram is generated which represents the number of pixels having a specific component value as shown in FIGS. 3A–3C.

Referring to FIG. 3A, the intensity histogram 170 includes three distinct peaks 172, 174, and 176. The intensity histogram 170 further includes valleys 178 and 179. The valleys 178 and 179 are located at the zero crossing locations where the first derivative of the filtered histogram is zero and the second derivative is less than zero. There are only three peaks 172, 174, and 176 because the image 160 includes only three distinct colors, red, green and blue which provide only three respective peaks in the intensity histogram. The largest peak 172 corresponds to the blue pixels of which there are 32640 in this example, and which have an intensity of approximately thirty-two. Peak 174 corresponds to red pixels which have an intensity of approximately fifty-four and the smallest peak 176 corresponds to green pixels which have an intensity of approximately eighty-seven. Here, the intensity values are normalized to range from 0 to 256.

Referring to FIG. 3B, the hue histogram 180 includes three distinct peaks 182, 184, and 186. The largest peak 182 corresponds to the blue pixels of which there are 32640 in this example, and which have a hue value of approximately seventy. Peak 184 corresponds to red pixels which have a hue value of approximately 156, and the smallest peak 186 corresponds to green pixels which have a hue value of approximately 267. It should be noted that a unit of hue space varies in degrees from $-\pi$ to $\pi$, but the hue values in histogram 180 are normalized so that the hue range varies from 0 to 300.

Referring to FIG. 3C, the saturation histogram 190 includes three distinct peaks 192, 194, and 196. The largest peak 192 corresponds to the blue pixels of which there are 32640 in this example, and which have a saturation value of approximately 87. The smallest peak 194 corresponds to green pixels which have a saturation value of approximately 112, and the peak 196 corresponds to red pixels which have a saturation value of approximately 179. Here, the saturation values are normalized to range from 0 to 200.

Using the image 160 of FIG. 3 and referring to the intensity histogram of FIG. 3A, a simple histogram-based segmentation method based only on thresholding can be explained. A first threshold (i.e., a vertical partition) is set in the valley 178 between first peak 172 and the second peak 174 and a second threshold is set in the valley 179 between second peak 174 and the third peak 176 to differentiate pixels based on their intensity values. The threshold values are easily determined from the valleys of each histogram by inspection. In the illustrative example, in which all of the pixels in the image have one of three distinct intensity values, each valley and thus, also the respective threshold is set midway between the two adjacent peaks.

Pixels in the image which have an intensity value below the threshold in the valley 178 are grouped in a first cluster. Pixels having an intensity value above the threshold in the valley 178 and below the threshold in the valley 179 are grouped in a second cluster. Pixels having an intensity value above the threshold in the valley 179 are grouped in a third cluster. More particularly, each interval between two valleys is assigned a specific label. One of the three labels is assigned to each pixel according to its corresponding value in the intensity histogram.

The resulting segmentation of the image is achieved by mapping the threshold ranges back to the spatial domain of the image as three segmented regions. It should be noted that additional local spatial information in the image is required to separate, for example, the red regions because the clustered red pixels are considered to be a single group, regardless of where they are located or which object includes the pixels. Similarly, if thresholds are set for the hue and saturation histograms shown in FIGS. 3B and 3C, respectively, each set of thresholds would result in an identical set of three clusters of pixels.

In order to use such a simple thresholding process in a one-dimensional space, homogeneous regions in the image must cluster into well-defined intervals in all three histograms. Further, if a color image has histograms with distinct peaks in all dimensions of the color space, as in the simplified example of FIG. 3, segmentation of only one of the dimensions of IHS color space is needed to accurately segment the original image 160 into distinct regions because there are only three distinct regions. In addition, if the valley points 178–179 that separate the three peaks can be located correctly, no prior information is required for forming homogeneous segmented regions derived from the original image because knowledge of the number of homogeneous regions in the original image is not required.

Figure 4A:
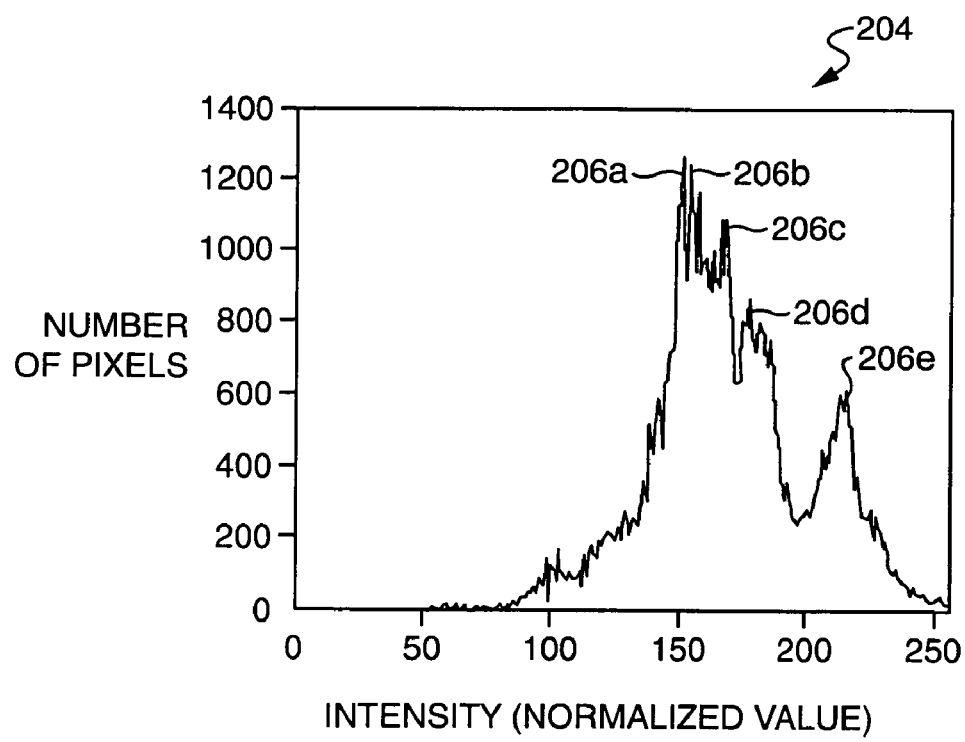
FIGS. 4A, 4B and 4C are the IHS histograms of the image of FIG. 4 respectively.
Figure 4B:
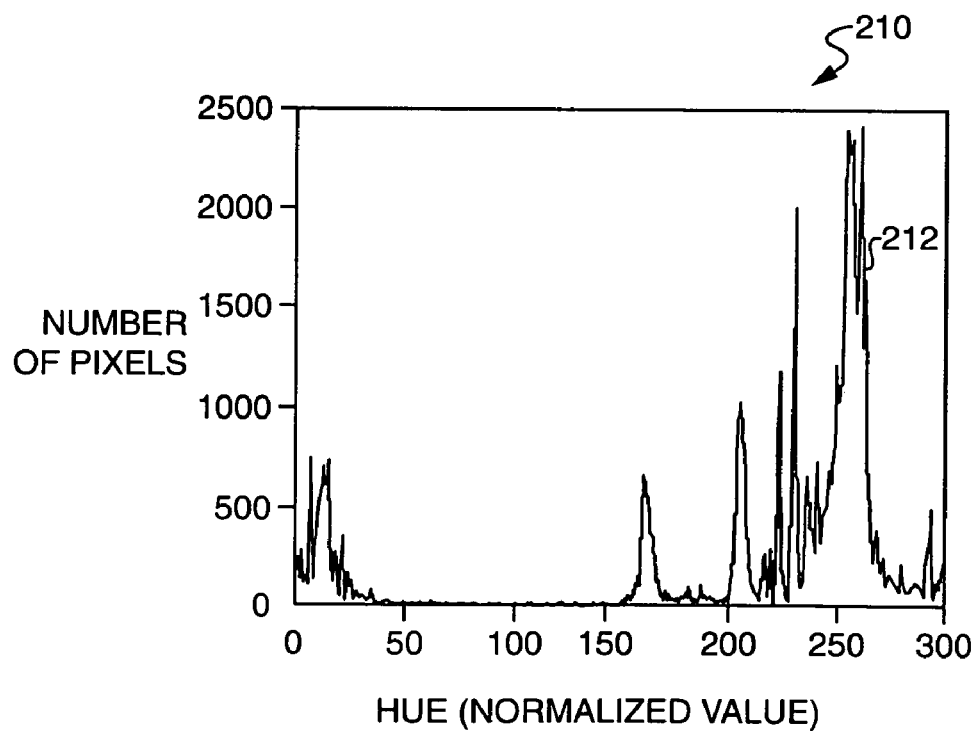
Figure 4C:
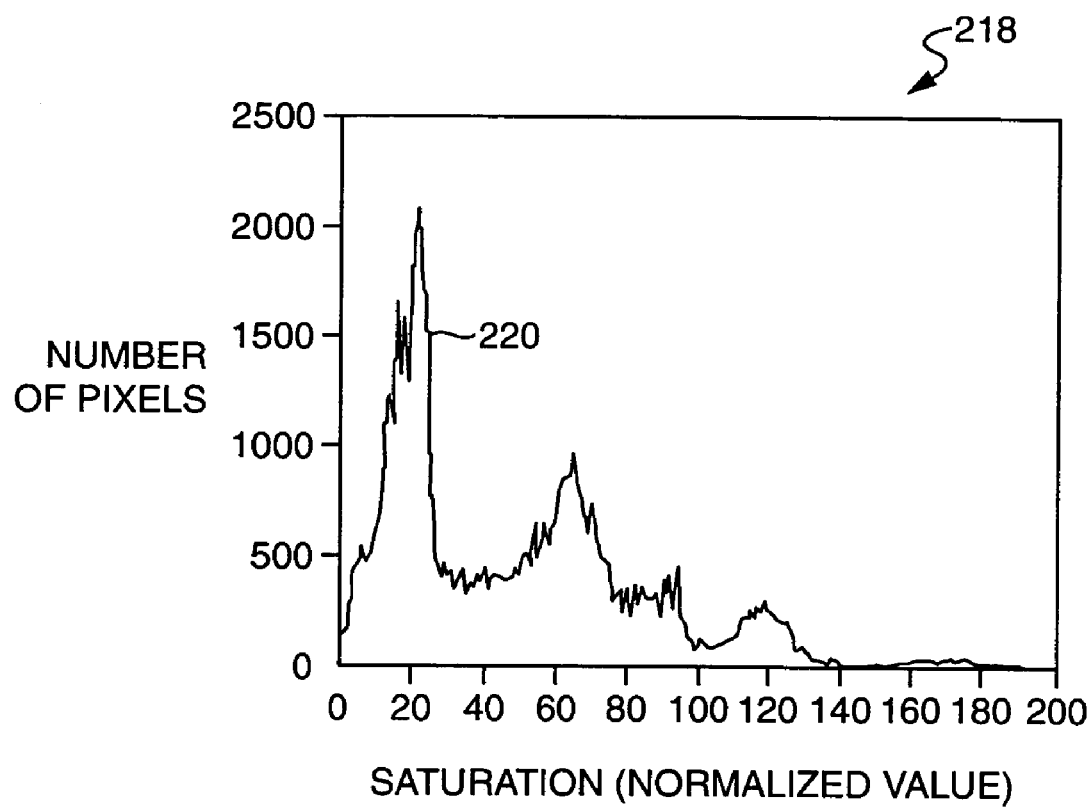

However, most images yield noisy hue, intensity and saturation histograms. Consider as an example the natural scene image 200 of FIG. 4 (which is a gray scale representation of a color image) and the respective intensity, hue and saturation histograms 204, 210, and 218 of FIGS. 4A, 4B and 4C respectively. The intensity, hue and saturation histograms 204, 210, and 218 include high frequency components because each histogram is a discrete approximation of each dimension's probability density function. It is often difficult to determine which peaks correctly separate uniform and homogeneous regions and which peaks are caused by variations in the original image in intensity, hue and saturation values that result from noise or the nonlinear transformation from RGB to IHS color space. Typically, the slowly varying peaks buried within the high-frequency variation represent uniform regions in the image. For example, the intensity histogram 204 appears to have at least five peaks 206a–206e, overlaid by high-frequency components. If the thresholds are set at the valleys between these peaks including the peaks formed by high frequency components, the image would be over-segmented resulting in poor segmentation. Conversely, the body 208 of the middle parrot 214 has the same range of intensity values as the middle section 216 of the background 222 so that the simple histogram threshold method described in connection with FIG. 3A would label these areas as a uniform region and under-segment the image.

The method of the present invention (FIGS. 1 and 2) improves upon the segmentation results obtainable with a simple thresholding scheme. The valley-seeking step 138 depends on the derivative or zero-crossing property of the signal-like histograms and is used to locate both peaks and valleys of the histograms as an initial step in the segmentation process. Noisy histograms often result in too many peaks and valleys. The filtering step 136 smoothes each histogram in order to locate valley points more precisely.

The filtering step 136 will now be described in conjunction with FIG. 5. Here, non-linear morphological filtering is used to enhance noisy images. Two morphological filtering operations used in step 136 are opening and closing operations. Combinations of dilation and erosion operations provide both the opening and closing operations. The morphological filter is used to strengthen certain characteristics of images and attenuate other characteristics and does not require a transformation, such as a Fourier or Hilbert transform, before initiating the filtering process. The morphological filter is used to reduce the high-frequency noise in the histograms by means of the opening and closing operations.

FIG. 5 shows an exemplary structuring element 230 used in an opening-closing operation to filter each of the I, H, and S histograms. The structuring element 230 is a predetermined geometric shape used in the morphological filter operations performed on the I, H and S histograms, each of which can be characterized as a discrete one-dimensional signal. The illustrated structuring element 230 includes a triangle with a window size of three arbitrary units. Since the value ranges of the I, H and S histograms in this embodiment are relatively small, 0–256, 0–300 and 0–200 respectively, the structuring element 230 with the window size set at three units is effective for each of the histograms because if the window size is larger than three, several of the small prominent peaks will be eliminated. The window size is generally set to an odd number to provide symmetry around the center of the structuring element 230. The coordinate values of the exemplary triangle structure are (−1,1), (0,5) and (1,1). It will be appreciated by those of ordinary skill in the art that other structuring elements and filtering techniques can be used to reduce the high frequency noise in the histograms. Known opening and closing operations derived from basic erosion and dilation using structuring elements provides morphological filtering as described in detail in C. R. Giardina and E. R. Dougherty, "Morphological Methods in Image and Signal Processing," Prentice Hall, Englewood Cliffs, N.J., 1988, pages 265–273.

Figure 6:
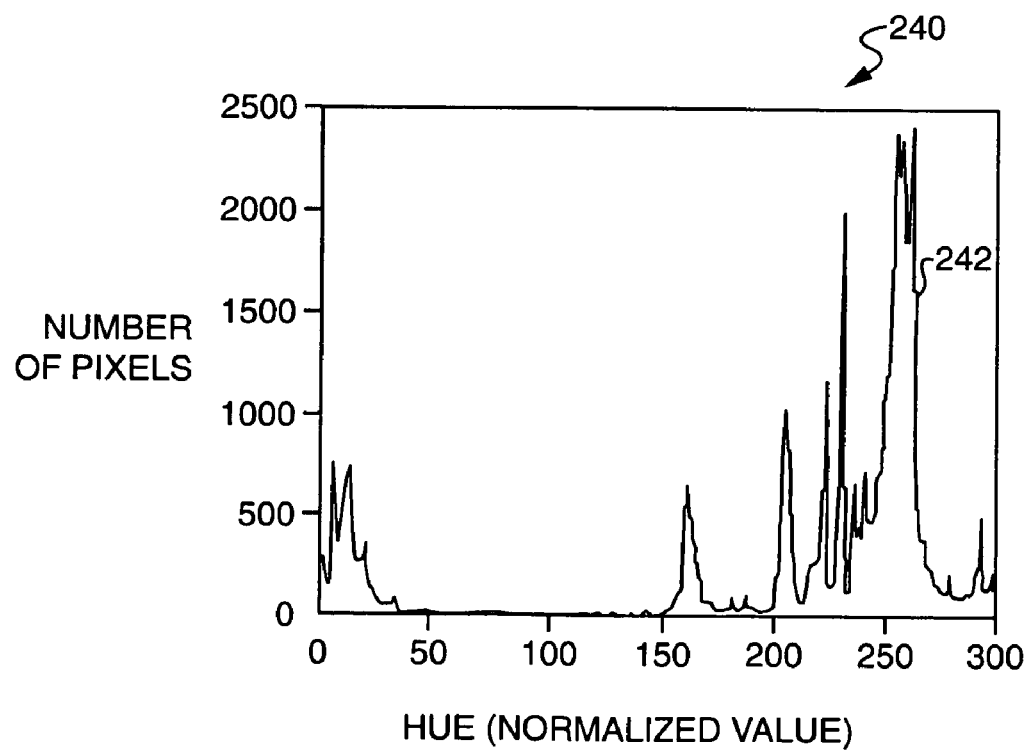
FIG. 6 is the hue histogram of the image of FIG. 4 after the closing operation using the structuring element of FIG. 5.

Now referring to FIG. 6, a hue histogram 240 illustrates the effect of the closing operation on the hue histogram 210 (FIG. 4B) of the natural scene image 200 of FIG. 4. Structuring element 230 of FIG. 5 is used in the closing operation. Using only the closing operation with the structuring element 230 is comparable to filling in the gap between consecutive peaks of the one-dimensional signal. Applying the closing operation alone does not eliminate the high-frequency noise.

Figure 6A:
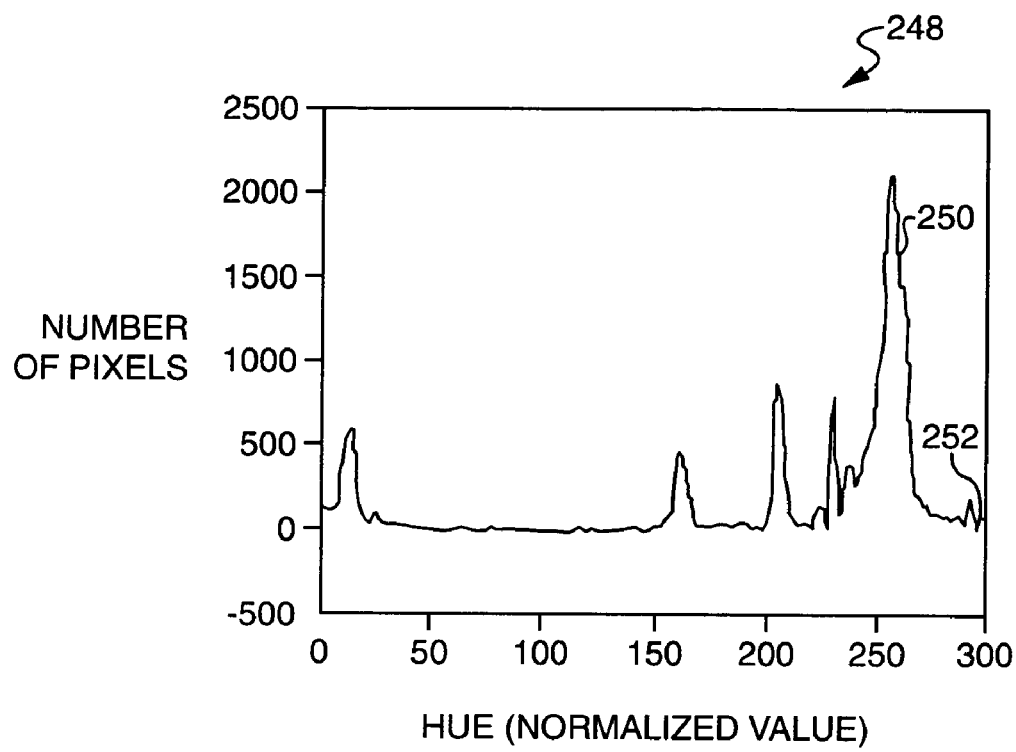
FIG. 6A is the hue histogram of the image of FIG. 4 after the opening operation using the structuring element of FIG. 5.

Now referring to FIG. 6A, a hue histogram 250 illustrates the effect the opening operation on the hue histogram 210 (FIG. 4B) of the natural scene image of FIG. 4. Using only the opening operation with the same structuring element 230 is similar to smoothing out the one-dimensional signal with a gaussian function having an effectively larger window size. Applying the opening operation alone can eliminate significant peaks as well as the high-frequency noise.

Figure 6B:
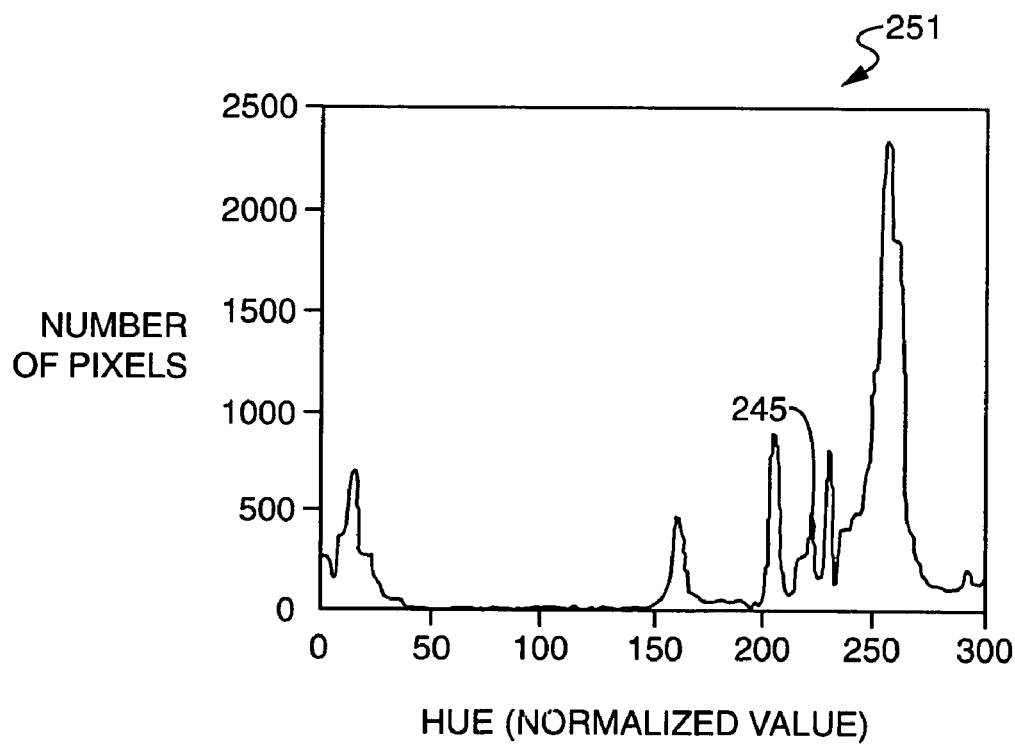
FIG. 6B is the hue histogram of the image of FIG. 4 after the opening and closing operations using the structuring element of FIG. 5.

Histogram 251 in FIG. 6B illustrates the combined opening-closing operation on the hue histogram 210 (FIG. 4B) using the structuring element 230, which effectively functions as a low-pass filter. In one embodiment, the opening operation occurs after the closing operation. Structuring element 230 of FIG. 5 is used in the opening operation. High-frequency noise in the histogram is reduced so that peaks yielding meaningful clustering results become prominent, for example peak 245. If a larger size structuring element (e.g. greater than three) is used, in this example, small concentrated peaks will be removed from the histogram completely. However, certain parts of a histogram have discrete step-shaped portions, similar to discrete one-dimensional signals. This discrete effect is overcome by the valley-seeking step 138 of the present invention which involves convolving the histogram with a Gaussian kernel or Gaussian filter, as described in conjunction with FIGS. 7–7C.

Figure 7:
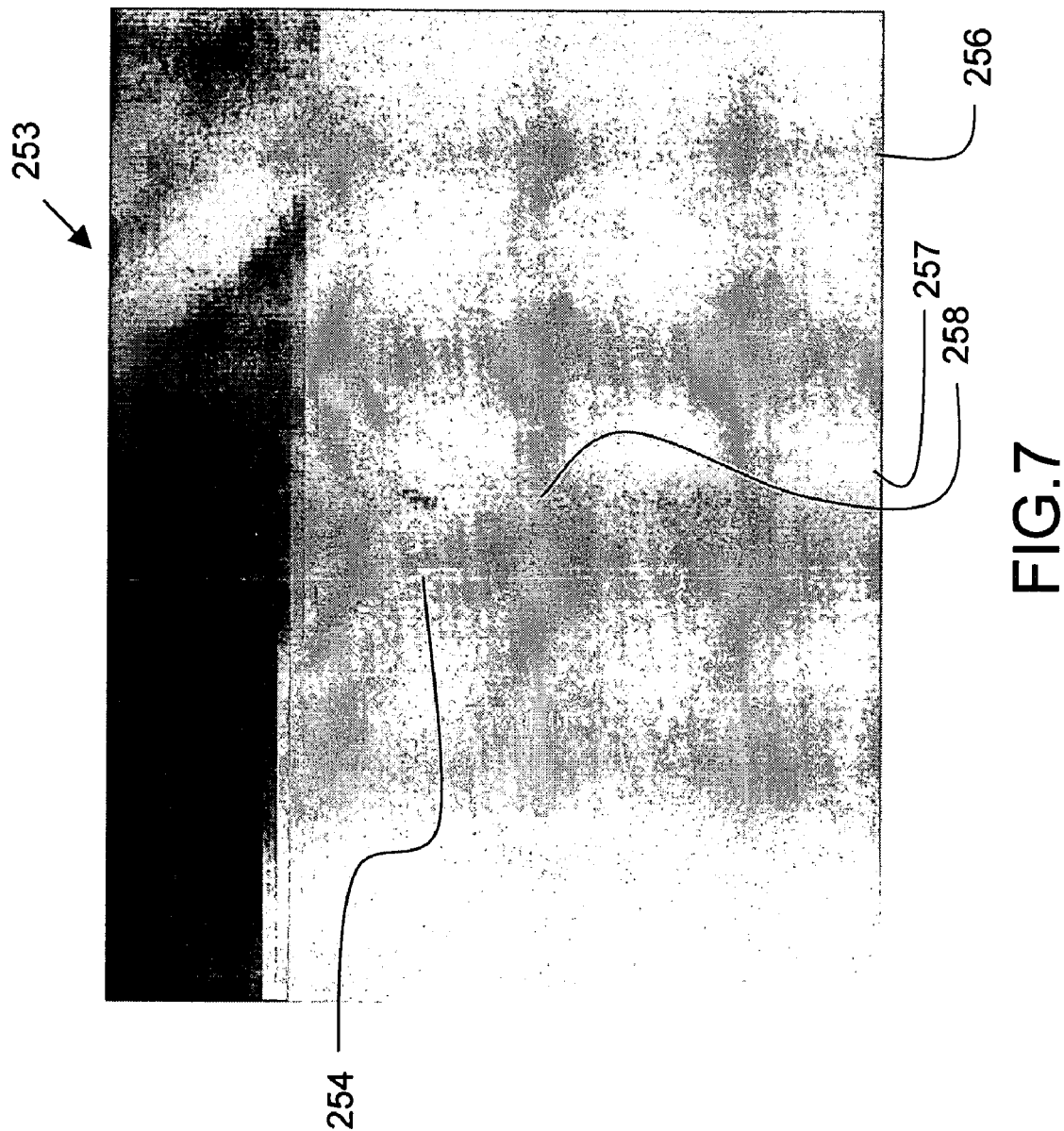
FIG. 7 is an atomic force microscope (AFM) image useful in describing the determination of local maximum and minimum points in IHS histograms.
Figure 7A:
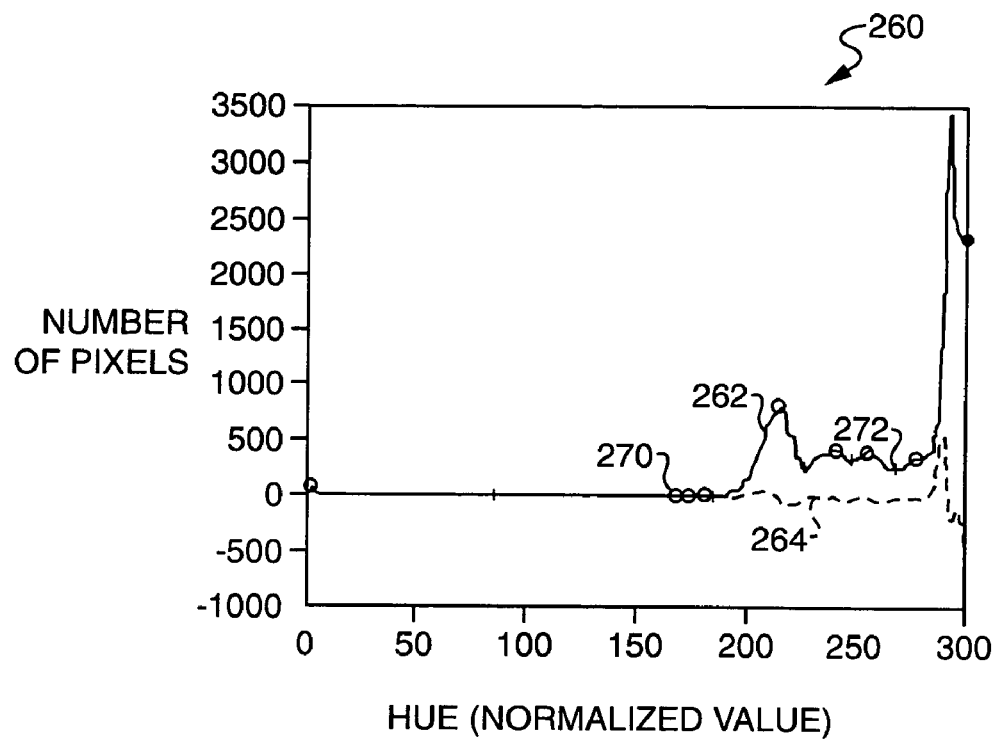
FIGS. 7A, 7B and 7C are the IHS histograms including the maximum and minimum points after the opening-closing operations on the histograms of the image of FIG. 7 respectively.
Figure 7B:
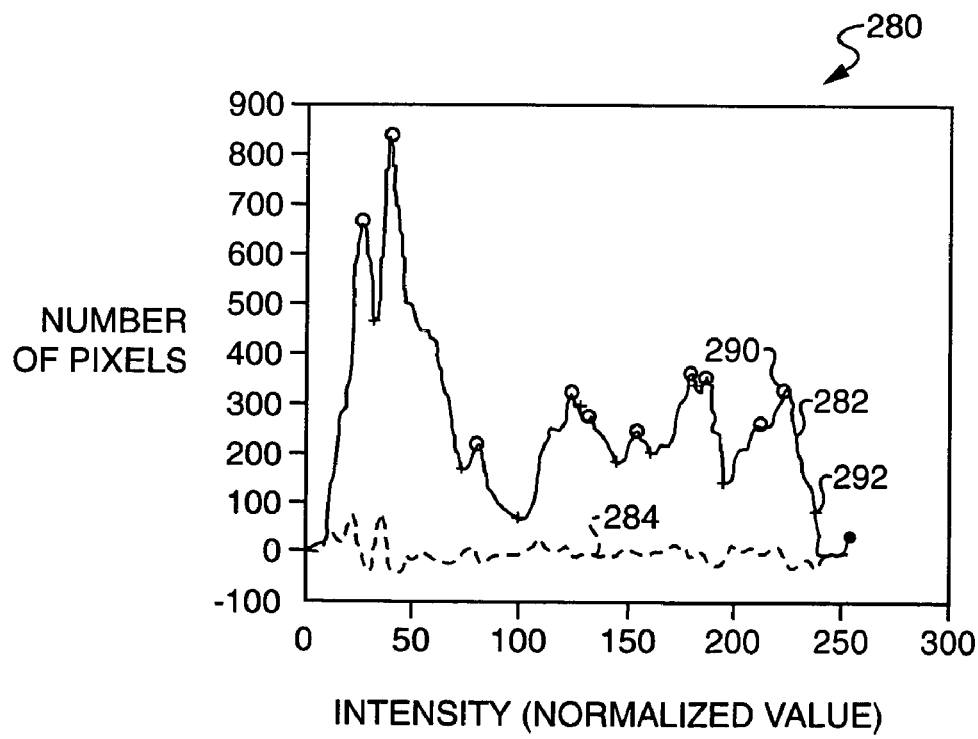
Figure 7C:
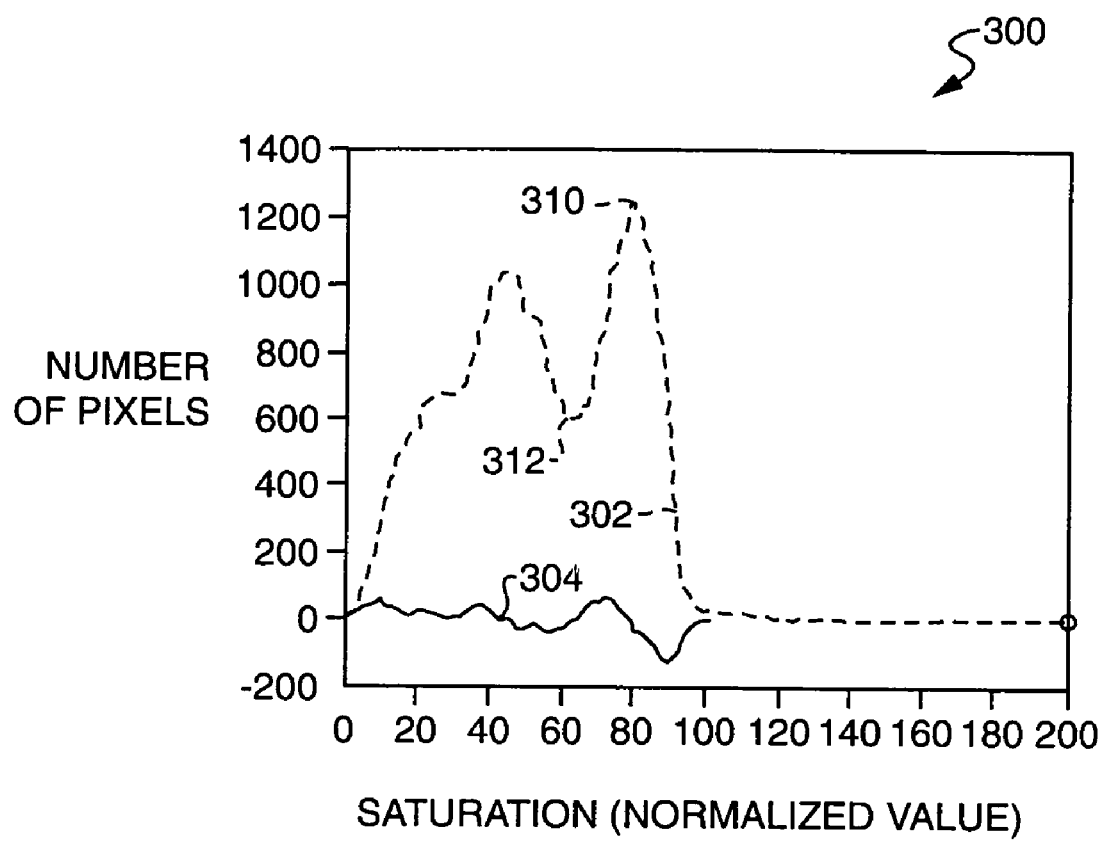
Figure 15:
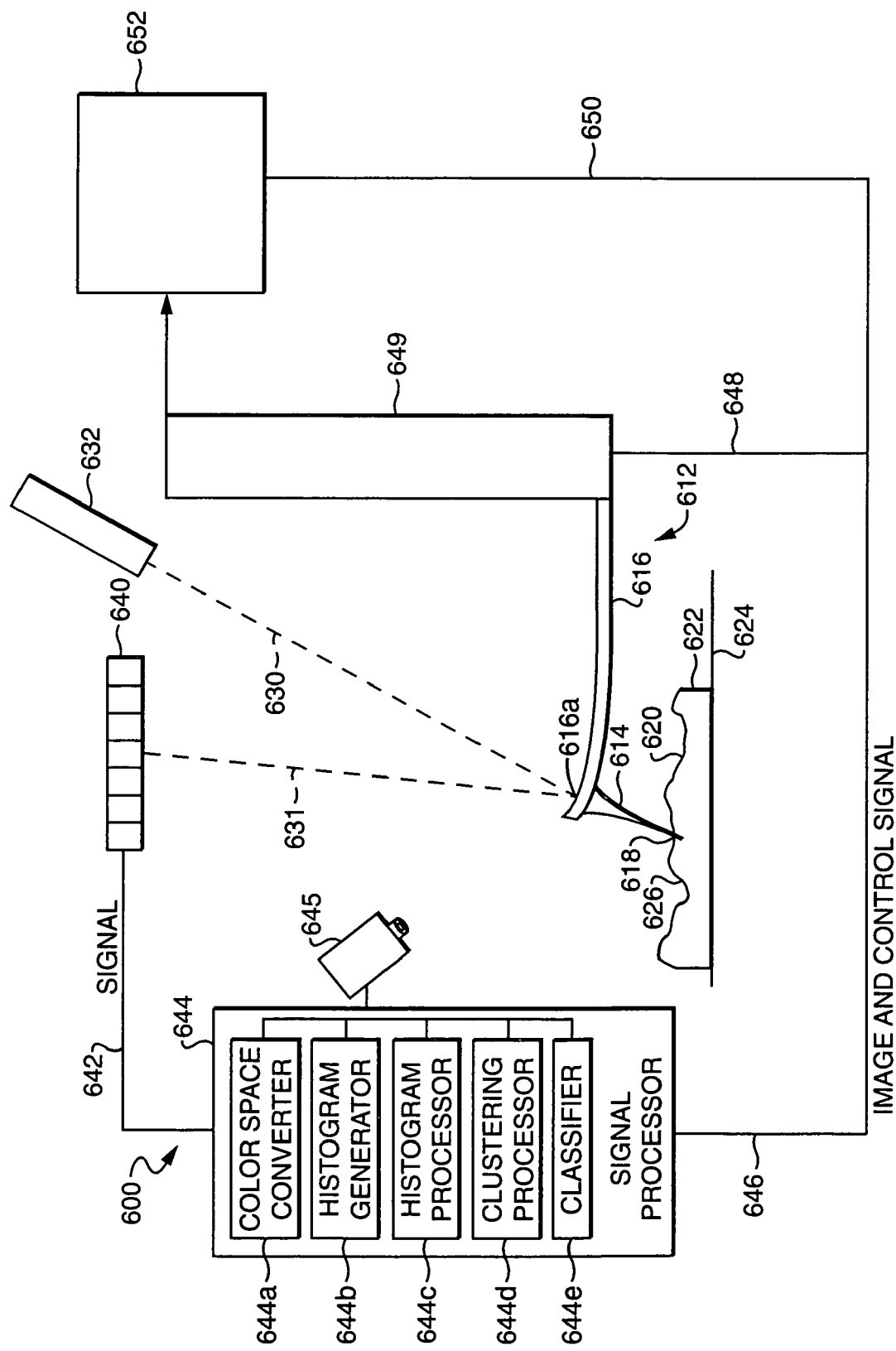
FIG. 15 is a block diagram of an atomic force microscope including an object recognition system according to the invention.

Now referring to FIG. 7, an image 253 includes a first object 254, here, a cantilever beam 616 (shown as a "V" shaped object) of an atomic force microscope (FIG. 15) and a second object 258 which corresponds to a probe tip 618 (FIG. 15), and a third object 257 which is a feature 626 (shown as a lighter vertical line descending from the cantilever beam 616) of a sample 622 (FIG. 15). Object 256 corresponds to a sample holder 624 (FIG. 15). FIGS. 7A, 7B and 7C, show the I, H and S histograms 260, 280 and 300 of the image 253, respectively. More particularly, each histogram after being filtered by the opening and closing operations described above is represented by solid lines 262, 282 and 302 respectively. The dashed lines 264, 284 and 304 represent the resulting histograms after performing the valley-seeking step 138. Circles 270, 290 and 310 denote zero-crossing points corresponding to peaks in the respective histograms 260, 280, and 310 and crosses 272, 292 and 312 denote zero-crossing points corresponding to valleys in the respective histograms 260, 280 and 310.

The manner in which the zero-crossing points are determined relies on finding the first derivative of the histogram signal. A one-dimensional gaussian function of predetermined size is constructed along with its derivative. In the illustrated example, the guassian function has a sigma value of one and a kernel size of nine. The Gaussian parameters are selected such that the convolution step smoothes each of the resulting histograms without completely eliminating the narrow peaks. The selection of parameters is determined experimentally using sample images of the objects of interest.

The opening-closing operation is applied to each histogram with the predetermined structuring element as described above. Thereafter, the resulting histogram (shown by solid lines 262, 282 and 302) is convolved with the derivative of the gaussian function to provide the histogram represented by dashed lines 264, 284 and 304, respectively. The points at which the resulting histograms 264, 284, and 304 cross a zero-horizontal line represent either the local maximum or local minimum points of the respective histogram. Convolving the filtered histogram signal with the derivative of Gaussian function is one method to find the derivative of the filtered signal.

To determine whether a zero-crossing point is a peak or a valley, the neighboring points on both sides of each zero-crossing point are considered. If there is a change from a positive value to a negative value from the zero-crossing point to either the next point or the preceding point, then the zero-crossing point is a peak. On the other hand, if there is a change from a negative value to a positive value from the zero-crossing point to either the next point or the preceding point, then the zero-crossing point is a valley. A threshold value is used to filter small changes due to noise which produces erroneous zero-crossings and to separate the erroneous zero-crossings from the zero-crossings of interest having greater peaks associated with segmented regions providing useful information. In one embodiment, the threshold is set at 1.0 in normalized range units. For example, if the difference between a zero-crossing point and a neighboring point is greater than the threshold, then the zero-crossing point is determined to be a peak or valley of the histogram used in the segmentation process.

A problem can occur if there is a peak either at the first or last point in the histogram before applying the opening-closing operation, since the opening operation will eliminate these peaks. The way in which this problem is solved will be discussed in connection with an illustrative image 320 in FIG. 8.

Figure 8:
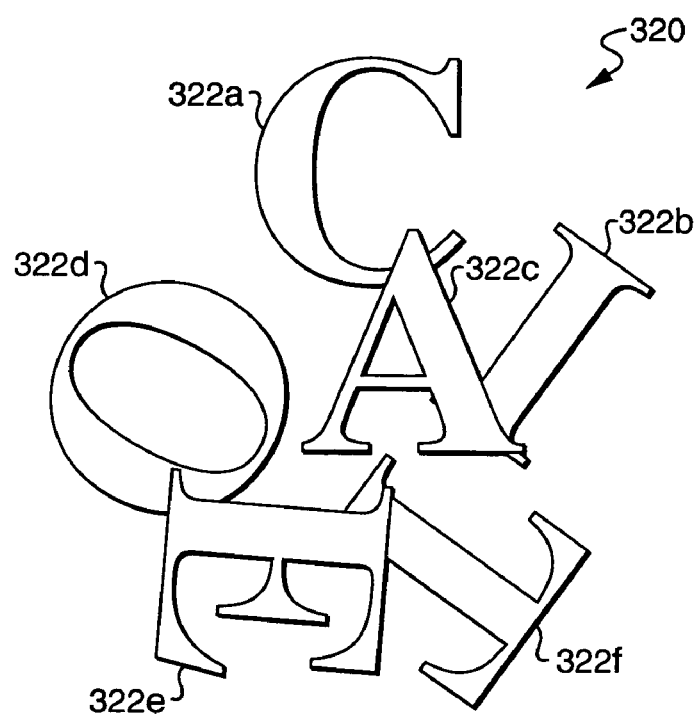
FIG. 8 is a synthetic image of six color characters.
Figure 8A:
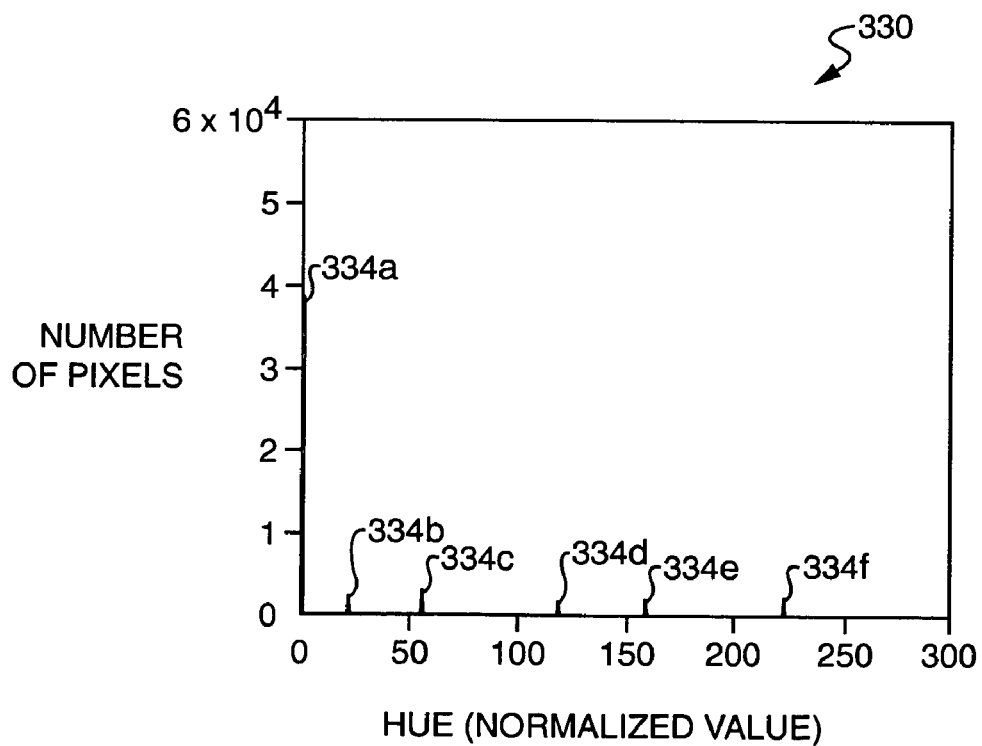
FIGS. 8A, 8B and 8C are the IHS histograms of the image of FIG. 8 respectively.
Figure 8B:
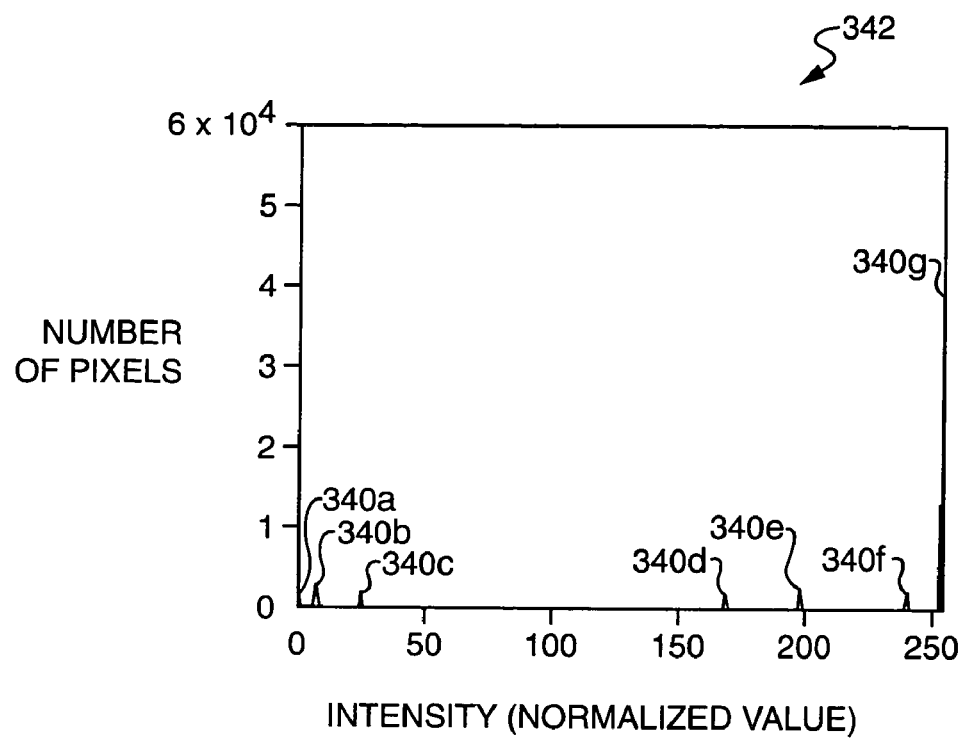
Figure 8C:
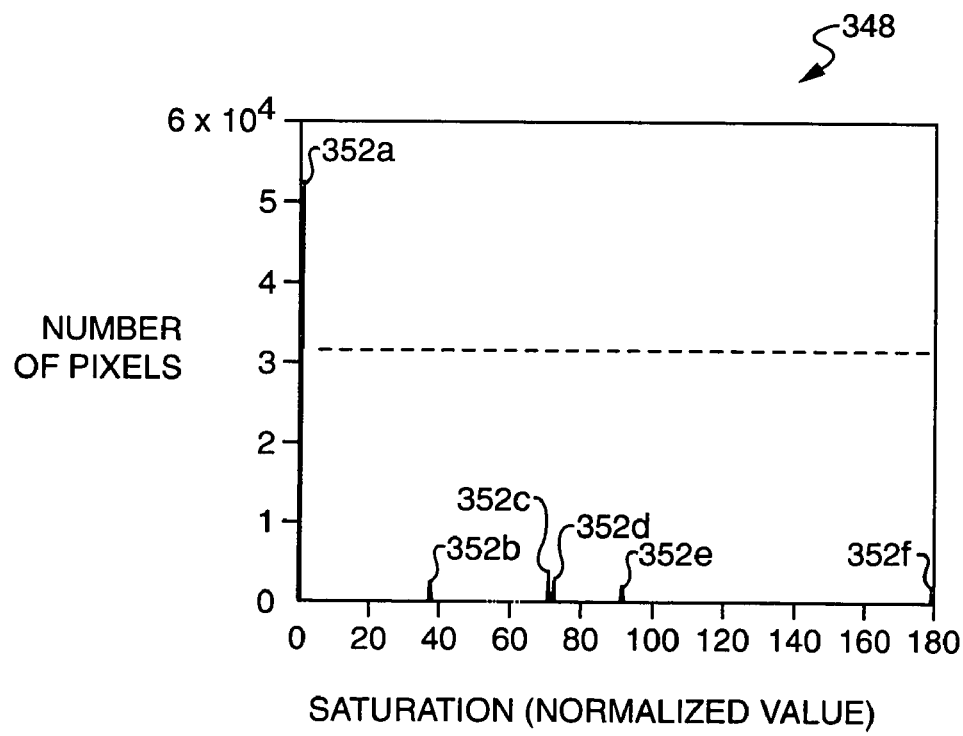

Referring to FIG. 8, an image 320 includes six color characters 322a–322f and a white background. The characters 322a–322f include a red "T" character, a green "A" character, a yellow "C" character, a dark blue "O" character, a light blue "E" character, and a purple "I" character. FIGS. 8A, 8B and 8C illustrate the H, I and S histograms 330, 342 and 348 of the image 320 of FIG. 8, respectively. Each histogram 330, 342 and 348 contains distinct peaks 334a–334f, 340a–340g, and 352a–352f, respectively, as shown.

Figure 8D:
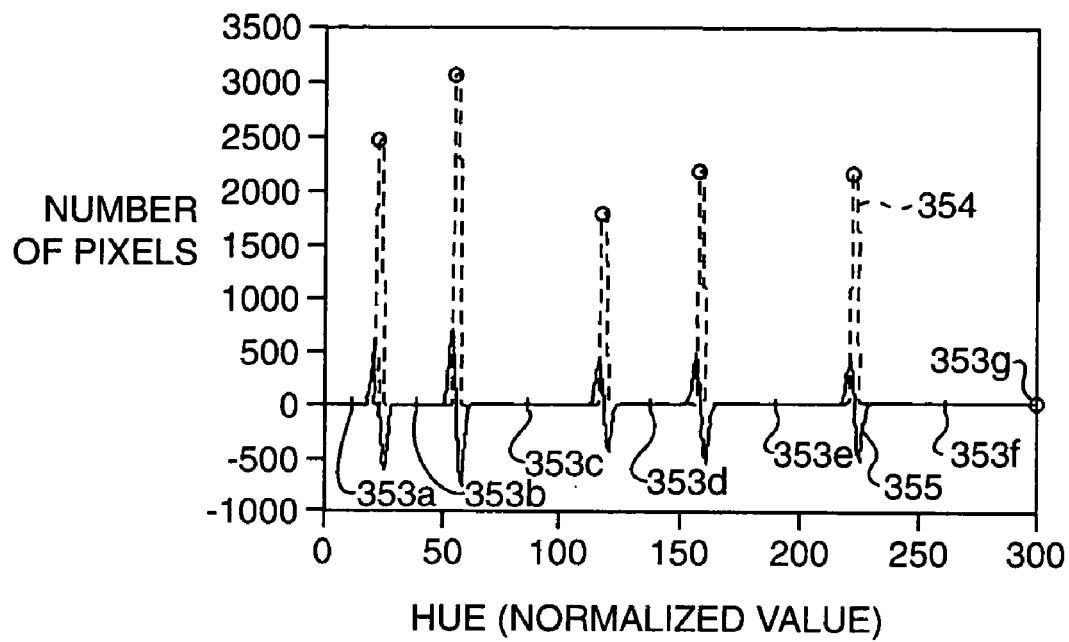
FIGS. 8D, 8E and 8F are the histograms of the image of FIG. 8 including the maximum and minimum points after the opening-closing operations on the histograms of the image of FIG. 8.
Figure 8E:
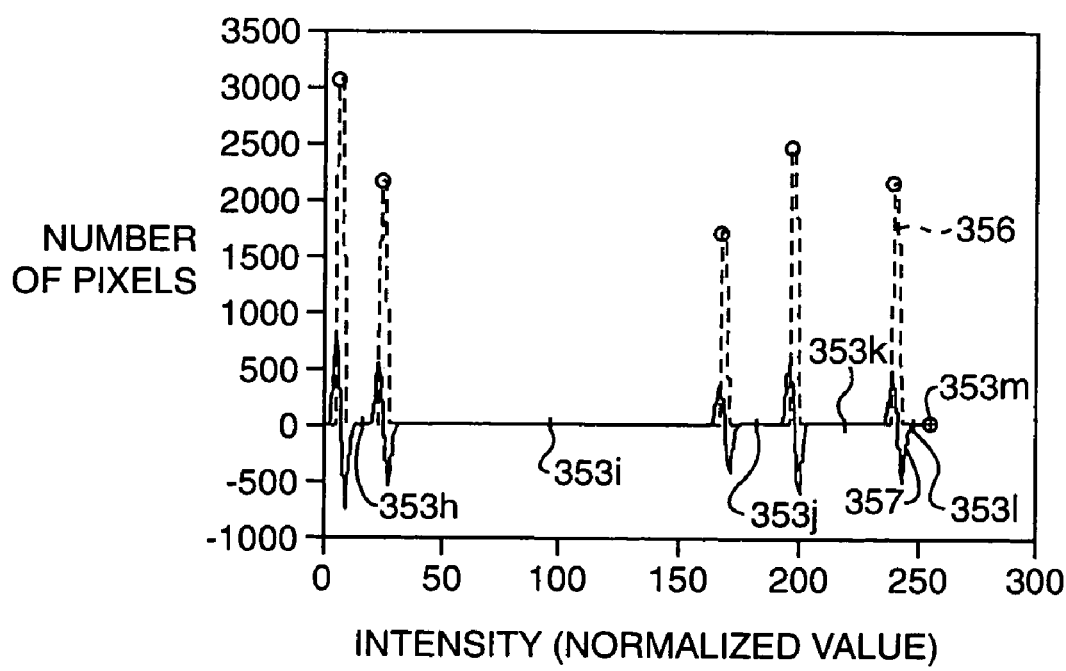
Figure 8F:
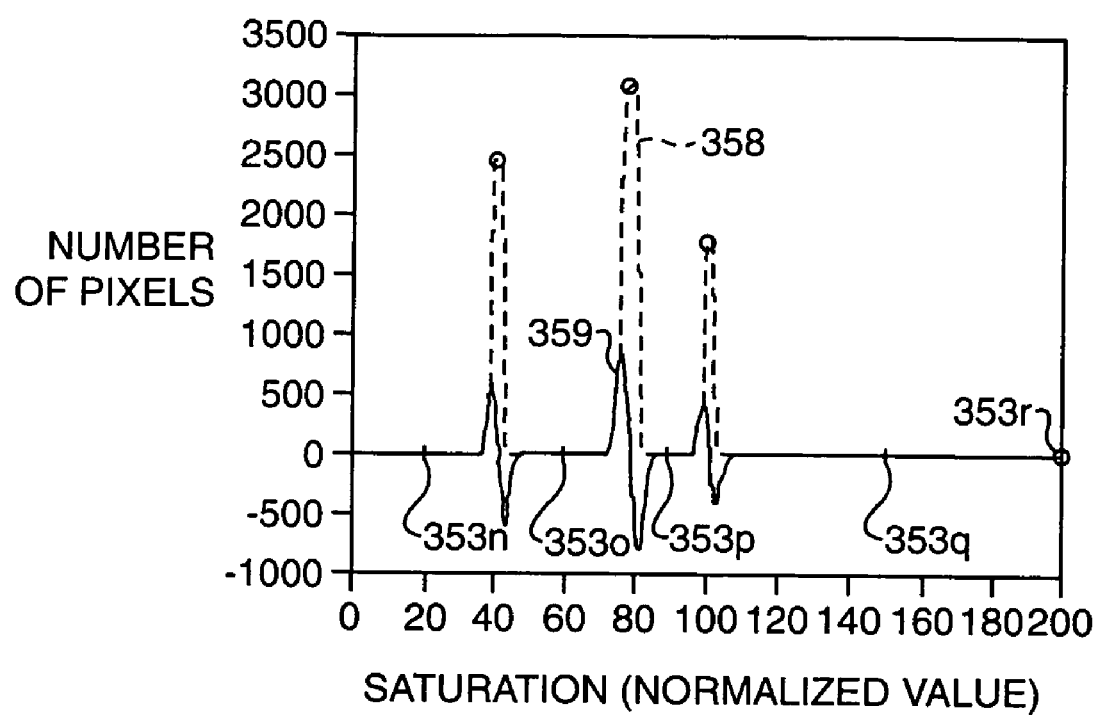

FIGS. 8D, 8E and 8F illustrate the zero crossings of the I, H, and S histograms following the filtering step 136 and the valley-seeking step 138. More particularly, the solid line histograms 354, 356, and 358 illustrate the respective I, H and S histograms after the opening-closing operation and the dashed line histograms 355, 357 and 359 represent the result of convolving each solid line histogram with the derivative of the gaussian function as described above.

The way in which the valley-seeking method detects the occurrence of peaks at the first and last points in the original histograms is as follows. If there is a peak at the first point of the histogram, then one valley point is added between this first point in the original histogram and the first peak obtained from the opening-closing histogram. A similar method is applied to identify a peak at the last point in the original histograms.

Considering FIGS. 8A, 8B and 8C, there are peaks at the first point in both the hue and saturation histograms and a peak at the last point in the intensity histogram. According to the valley seeking technique, additional valley points are added to the hue and saturation histograms for detecting the peaks at the first point of the original histograms (FIGS. 8B and 8C) and additional valley points are added to the respective intensity and saturation histograms for detecting the peak at the last point of the original intensity histograms of FIGS. 8A and 8C. In this example, seven valley points 353a–353g project seven intervals along the hue axis with valley point 353a added as described above, six valley points 353h–353m project six intervals along the intensity axis with valley point 353l added, and five valley points 353n–353r project five intervals along the saturation axis with valley points 353n and 353q added.

Figure 9:
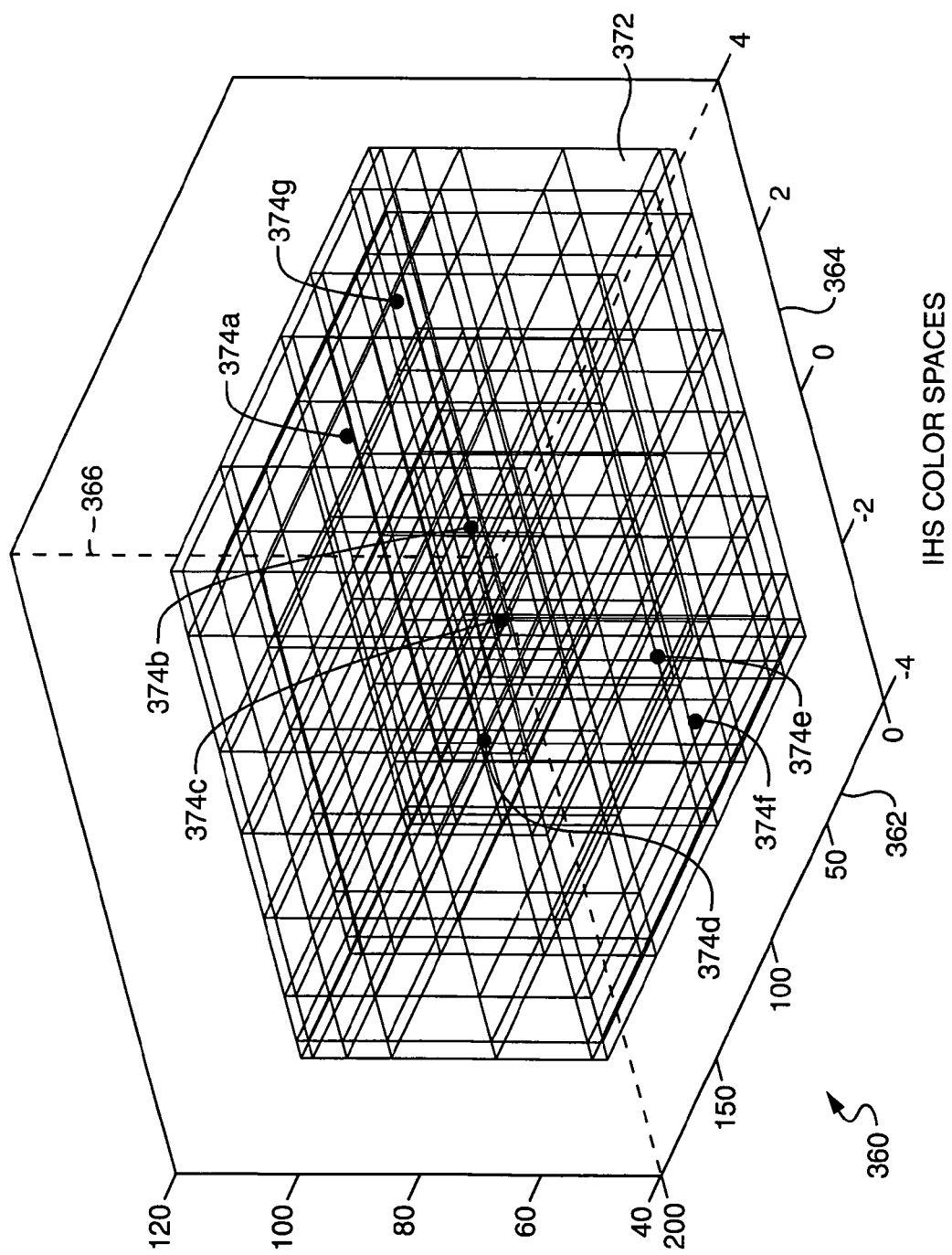
FIG. 9 is a set of sampled points of the six color characters image of FIG. 8 plotted in a three-dimensional color space, illustrating a connecting-box structure formed by using the valleys of the histograms of FIGS. 8D–8F.

Referring to FIG. 9, each histogram valley, for example valleys 353a–353g in FIG. 8D, is projected into three dimensions to construct a connecting-box structure 372 (step 140 of FIG. 2). The three-dimensional color space 360 has a saturation axis S 362, a hue axis H 364, and an intensity axis I 366. The eight vertices of each connecting-box in the connecting-box structure 372 are formed at points in the three-dimensional color space 360 where the intersection of valleys occurs in the respective histograms as illustrated in two dimensions in FIG. 9A.

More particularly, each valley corresponds to a boundary of an interval on the respective histogram. In the example of the synthetic six color character image there are seven, six and five intervals for hue, intensity and saturation spaces, respectively. Thus, there are total of 210 connecting-boxes (i.e. the product of seven and six and five) resulting from the projection of the valleys 353a–353g (FIG. 8D), 353h–353m (FIG. 8E), and 353n–353r (FIG. 8F) to form the connecting-box structure 372.

The seven data points 374a–374g represent clusters which include the pixels of the six color characters and the white background in the original image. Because there is no color gradation in these seven synthetically generated color regions, each color including the white background gathers into single point clusters 374a–374g.

Each pixel in the image is located in the three-dimensional color space either inside or at the faces of these connecting-boxes. For the synthetic image of six color characters, only seven boxes out of 210 boxes contain the sampled data or pixels of the image, while the other boxes are empty. This is because the original image segments into seven distinct classes corresponding to the seven non-empty connecting-boxes in the IHS color space. These seven classes correspond to the red "T" character, the green "A" character, the yellow "C" character, the dark blue "O" character, the light blue "E" character, the purple "I" characters and the white background of FIG. 8. In images where there are more color gradations, the sampled data in the IHS color space scatter to a greater degree and do not assemble into as few distinct groups or classes formed from connecting-boxes as shown in the example of the six color character image (FIG. 8).

Figure 9A:
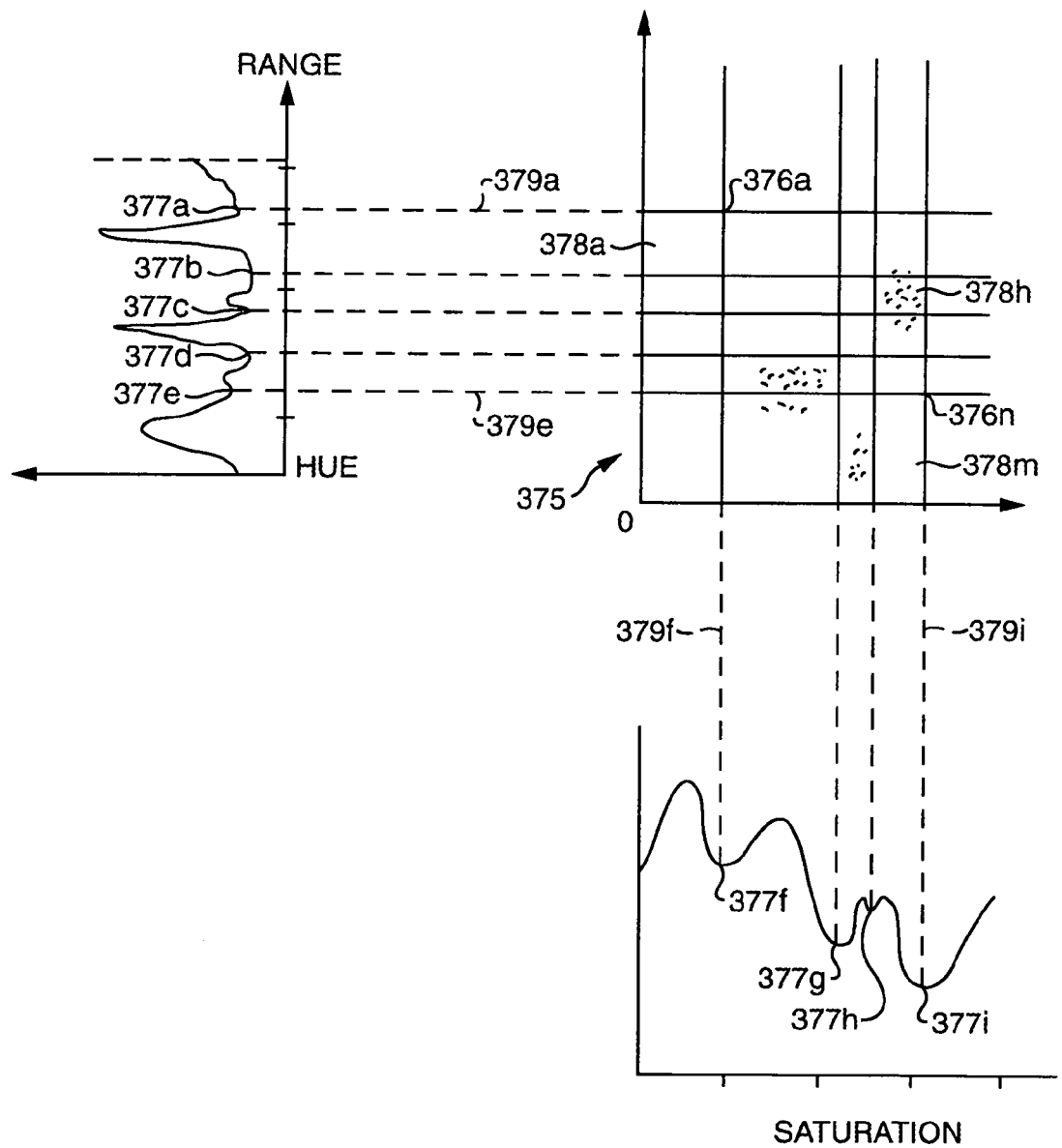
FIG. 9A is a two-dimensional diagram useful in illustrating how the histogram valleys are projected in a three-dimensional space to form the connecting-box structure of FIG. 9.

FIG. 9A is a two-dimensional view of a portion 375 of a connecting-box structure like the connecting-box structure 372 of FIG. 9. The portion 375 of the connecting-box structure is formed by projecting valleys 377a–377e (generally referred to as valleys 377) from a hue histogram and valleys 377f–377i from a saturation histogram. A set intersecting planes 379a–379i (shown here in two dimensions as dotted lines for clarity) corresponding to the respective hue and saturation valleys 377 form the vertices 376a–376n of a plurality of connecting-boxes 378a–378m (shown as rectangles in two dimensions). For example, valleys 377a and 377f are projected and intersect to provide vertex 376a. The portion 375 of the connecting-box structure includes the plurality of connecting-boxes 378a–378m, some of which are shown with pixels mapped from the image, for example, box 378h. Some of the connecting-boxes do not contain any pixels, for example, box 378a. It is understood, that a set of intersecting planes (not shown) corresponding to intensity histogram valleys intersect with planes 379a–379i to form the remaining vertices of the connecting-boxes. In other words, sets of orthogonal planes corresponding to valleys in each of the three histograms intersect in the three-dimensional space to form the connecting-boxes 378. The projections of the valleys 377 are used to form, for example, the connecting-box structure 372 from H, I and S histogram in FIGS. 8D, 8E and 8F. If a pixel is located on the face of two neighboring connecting boxes, the pixel is assigned to the connecting-box which is closer to the origin of axes in the three-dimensional space.

Figure 10:
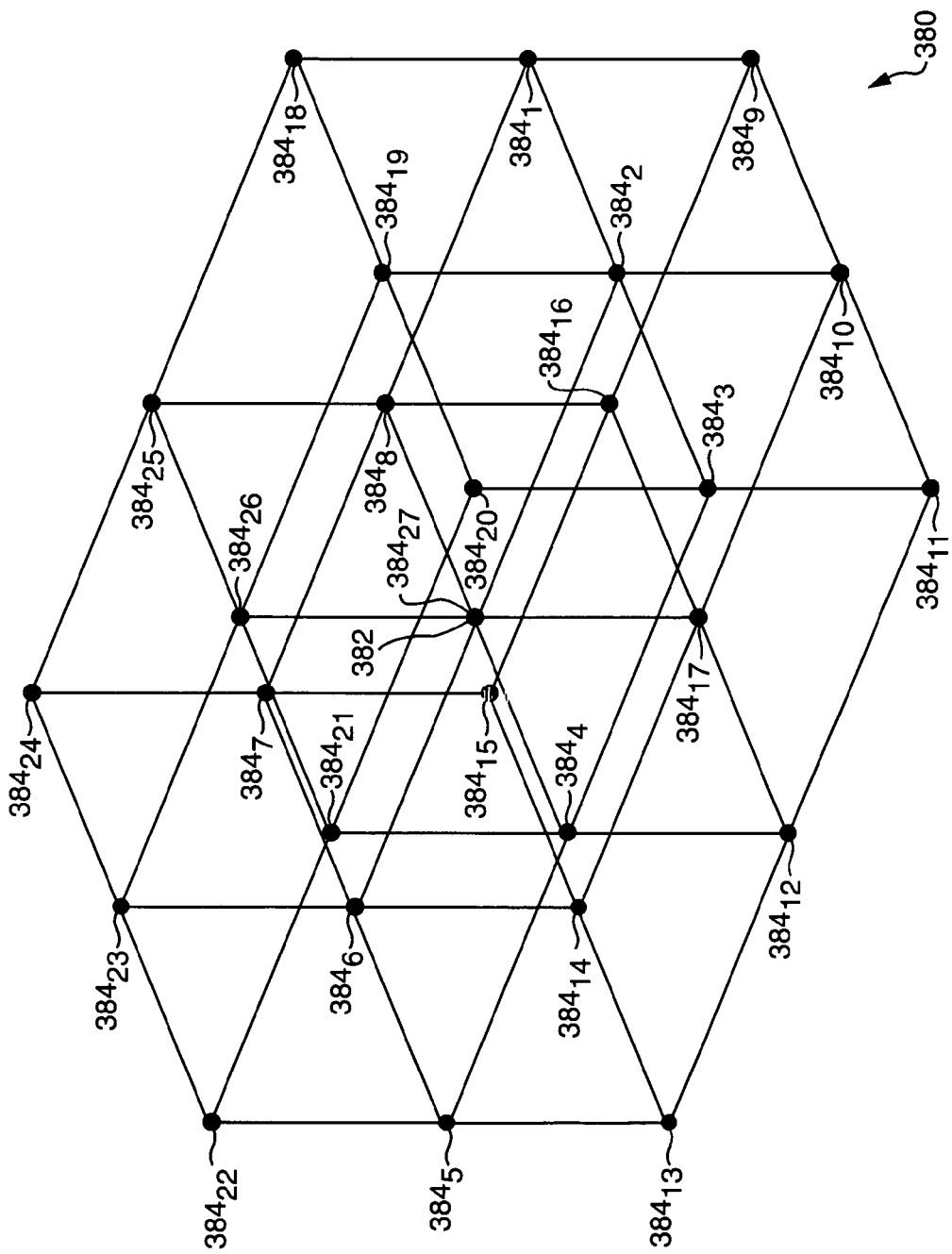
FIG. 10 shows the connecting-box structure of FIG. 9 represented as connecting nodes.

Now referring to FIG. 10, each of the connecting-boxes of a portion of the connecting-box structure 372 (FIG. 9) is represented as a connecting node 384, of which there are twenty-seven shown and labeled $384_1$–$384_{27}$. Each node $384_1$–$384_{27}$ is connected to its neighboring nodes. Nodes $384_1$–$384_{27}$ correspond to nodes within a three connecting-box by three connecting-box by three connecting-box window as used in one embodiment. Node $384_{27}$ is centrally located within the window. The window is used in conjunction with the process of FIG. 11 for forming clusters in the three-dimensional space. Node $384_{27}$ (also referred to as the central node of the three node by three node by three node window as used in one embodiment) is surrounded by twenty-six nearest neighboring nodes $384_1$–$384_{26}$. In this example, nodes $384_1$–$384_8$ have the same intensity value as node $384_{27}$ and nodes $384_9$–$384_{17}$ are one unit lower in intensity than node $384_{27}$. Nodes $384_{18}$–$384_{26}$ are one unit higher in intensity than node $384_{27}$.

Figure 12:
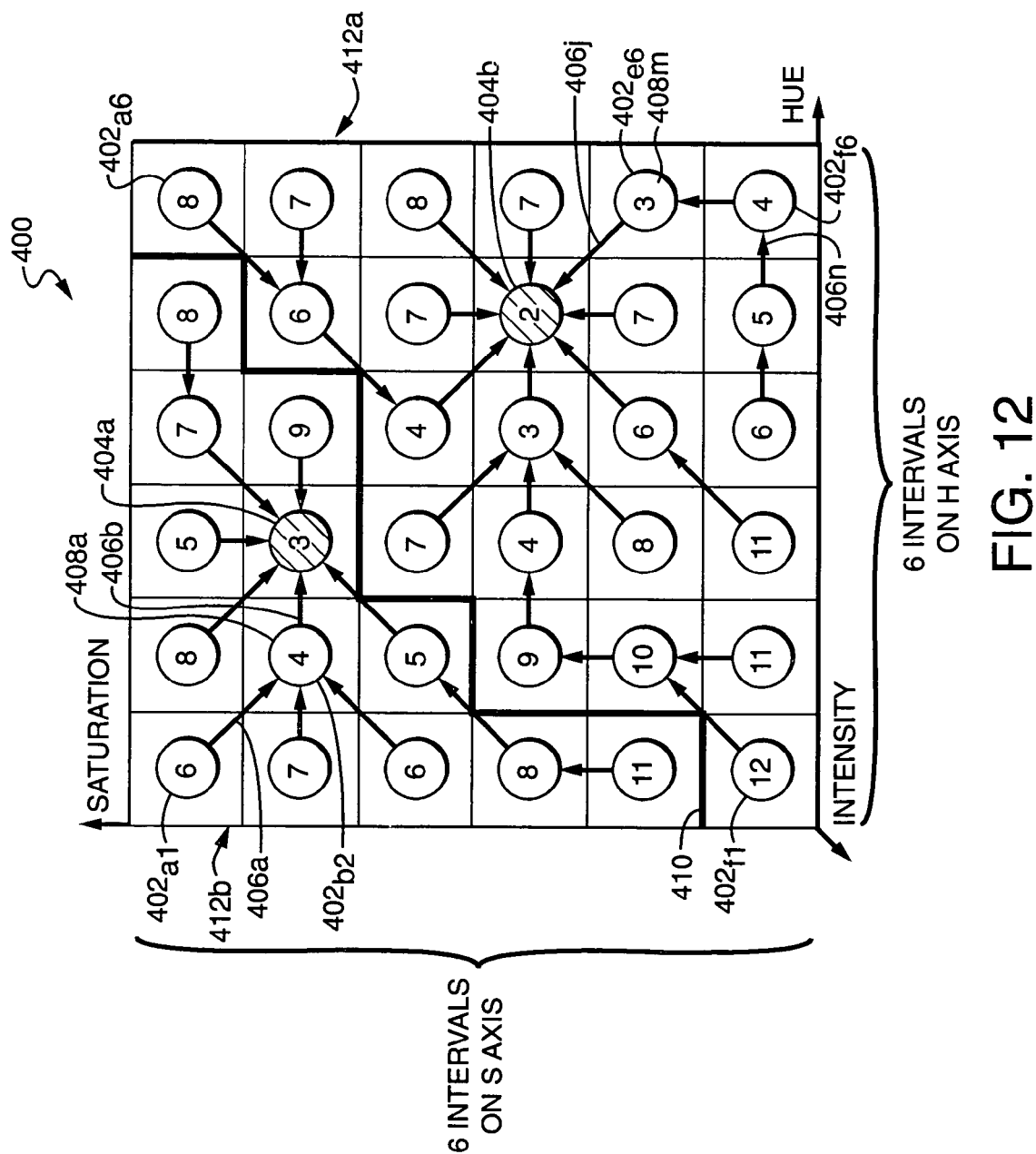
FIG. 12 shows an exemplary tree-like diagram useful in explaining the clustering of two distinct classes in one of the intensity levels of a hue-saturation (H-S) plane.

Referring also to FIG. 11, a flow diagram illustrates a process for clustering connecting-boxes containing pixels in a color space, here, in IHS color space. The steps shown in FIG. 11 describe in more detail step 108 of FIGS. 1 and 2. The clustering technique involves identifying each connecting node in a connecting-box structure (similar to the connecting-box structure 360 in FIG. 9) to be either a root or branch node in order to form a tree-like structures 412a and 412b (FIG. 12). As will become apparent, the described clustering technique advantageously permits clustering of the sampled data in three dimensions in a short period of time and without iterative processing.

A root node is a connecting-box, or connecting node which has a local minimum normalized variance. In one embodiment, the determination of the local minimum normalized variance includes evaluating all nodes within a moving window (e.g. evaluating twenty-seven nodes within the three by three by three moving window of FIG. 10). The root nodes of the tree structures are determined as described in steps 504–514 (FIG. 11). It will be appreciated by those of ordinary skill in the art, that moving windows having different sizes can be used to determine local minimum normalized variances. When a potential root node is at the boundary of the connecting-box structure 380, for example node $384_{26}$, fewer neighboring nodes have to be evaluated to determine whether the node is a root node or a branch node.

The process commences in step 500 after a plurality of connecting-boxes have been generated by valley projection, following which the normalized variance of each node in the connecting-box structure 380 is computed in step 502. In one embodiment, the variance of each node is computed using the range of color space values of the pixels included within each connecting-box according to the following equation:

$$Var(N_i) = \left(\frac{N(N_i)}{\sum_i N(N_i)}\right)\left(\frac{\sum_i Vol(N_i)}{Vol(N_i)}\right) \quad (12)$$

$$\sqrt{Var(R_{hue}(N_i)) + Var(R_{int}(N_i)) + Var(R_{sat}(N_i))}$$

Where:
N ($N_i$) represents the number of sampled points (i.e., pixels) that fall inside or on the face of the connecting-box/node $N_i$;
Vol($N_i$) denotes the volume of the connecting-box/node $N_i$;
$R_{sat}$ ($N_i$) is the range on the saturation axis for node $N_i$ in the connecting-box structure;
$R_{int}$ ($N_i$) is the range on the intensity axis for node $N_i$ in the connecting-box structure;
$R_{hue}$ ($N_i$) is the range on the hue axis for node $N_i$ in the connecting-box structure;
Var($R_{hue}(N_i)$) is the variance of pixel values in the range of Hue along the H axis for node $N_i$;
Var($R_{int}(N_i)$) is the variance of pixel values in the range of Intensity along the I axis for node $N_i$; and
Var($R_{sat}(N_i)$) is the variance of pixel values in the range of Saturation along the S axis for node $N_i$.

In step 504, one of the nodes from the plurality of nodes in the three-dimensional IHS color space is selected as a central node to determine if the selected node has a local minimum normalized variance value and can be identified as a root node. In one embodiment, step 504 is implemented using a moving window having of size of three connecting-boxes by three connecting-boxes by three connecting-boxes to examine twenty-seven connecting-boxes at a time in the three-dimensional color space with the selected central node positioned in the center of the moving window.

In step 506, it is determined whether the central node has the smallest normalized variance as computed by Equation 12 when compared to each of the twenty-six neighboring nodes. For example, node $384_{27}$ (FIG. 10) is a central node within a three by three by three moving window positioned within the connecting-box structure. If it is determined that the central node has the smallest local minimum normalized variance when compared to the twenty-six neighboring nodes then processing continues at step 508, otherwise processing continues at step 510.

In step 508, the selected central node is identified as a root node and will form a cluster in the three-dimensional color space either by itself or with other branch nodes linked in a tree structure similar to a tree-like structure 412a (shown in FIG. 12 in two dimensions for clarity). Processing continues in step 518.

In step 510, after it is determined that the central node in the three by three by three moving window does not have the smallest normalized variance value among its twenty-six neighboring nodes, a branch is formed having a direction from the current central node to one of the neighboring nodes of the twenty-six neighboring nodes having the smallest normalized variance. The branch direction for each node follows the steepest direction of the minimum of the normalized variance among each the current central node's twenty-six neighboring nodes. In particular, a branch is directed from the central node to the neighboring node having the smallest normalized variance. The normalized variance values calculated in step 502 are used to construct a series of branches (i.e., directional interconnection) which form paths in a steepest gradient descent direction from an initial node to a root node. In other words, the steepest gradient descent direction is the direction from a node toward the neighboring node having the smallest normalized variance value according to Equation 12. In one embodiment, if two nodes have identical smallest normalized variance values, the first node examined (using the order of FIG. 10, i.e. node $384_1$ is examined first and node $384_{26}$ is examined last) is chosen as the potential branch node. In this step the neighboring node having the smallest normalized variance is considered a potential branch node until it is determined that connectivity exists between the potential branch node and the currently selected central node. In steps 510 through 514, the neighboring nodes are individually considered, in order of increasing normalized variance, as a potential branch node until it is determined that there is connectivity between the central node and the potential branch node, at which time the determination of a branch node is completed.

Figure 13:
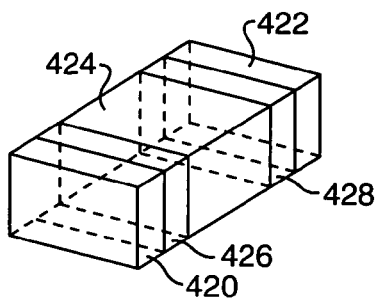
FIG. 13-13J are schematic views of the volumes in the three-dimensional IHS color space between an initial node and its twenty-six neighboring nodes, used for determining branch directions.
Figure 13A:
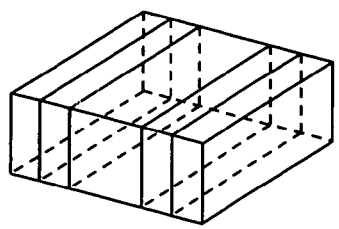
Figure 13B:
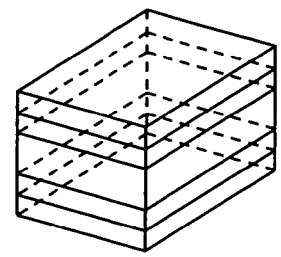
Figure 13C:
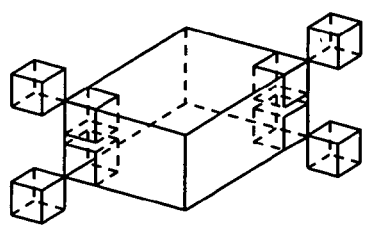
Figure 13D:
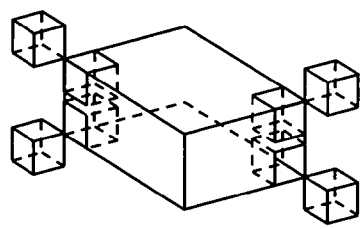
Figure 13E:
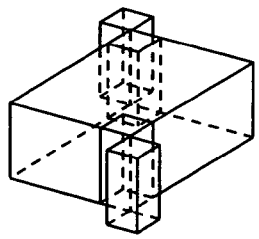
Figure 13F:
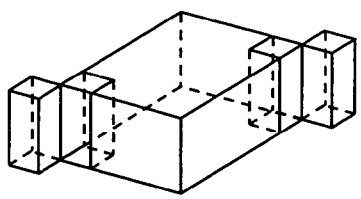
Figure 13G:
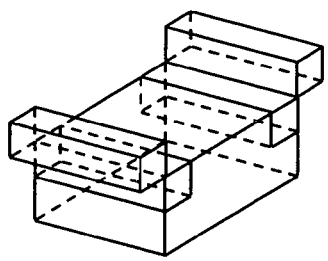
Figure 13H:
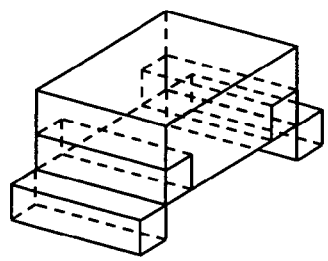
Figure 13I:
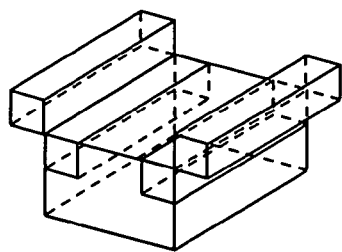
Figure 13J:
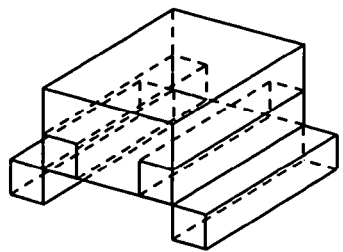

In step 512, it is determined whether is there connectivity between the central node and the potential branch node. A volume in the three-dimensional space is constructed to determine connectivity between the currently selected central node and the potential branch node selected in step 510. Referring also to FIGS. 13–13J, schematic views of the volumes in the three-dimensional I, H and S color space between the central node and its twenty-six neighboring nodes, used for determining connectivity to branch nodes are shown. Connectivity test volumes 426 and 428 (FIG. 13) are formed between the central node $384_{27}$ (FIG. 10) volume 424 and node $384_4$ (FIG. 10) volume 420 and node $384_8$ (FIG. 10) volume 422, respectively. In one embodiment, the thickness of the each box forming the specific volume that measures the number of the sampled points between the central node $384_{27}$ and the potential branch node is set to be approximately ⅙ (determined experimentally) of the length of one face (i.e. one interval) of the central node. The thickness is determined in a direction that connects the central node and the potential branch node. By determining that the volume between two connecting-boxes is not empty, connectivity between the central node of the moving window of step 504 and the potential branch node is established, as implemented in step 512. Likewise, FIGS. 13A–13J illustrate the volumes between the central node and nodes $384_2$ and $384_6$, $384_{17}$ and $384_{26}$, $384_9$, $384_{13}$, $384_{18}$ and $384_{22}$, $384_{11}$, $384_{15}$, $384_{20}$ and $384_{24}$, $384_3$ and $384_7$, $384_1$ and $384_5$, $384_{21}$ and $384_{25}$, $384_{12}$ and $384_{16}$, $384_{19}$ and $384_{23}$, and $384_{10}$ and $384_{14}$, respectively.

If it is determined that there is connectivity between the central node and the potential branch node, the potential branch node is considered a branch node for the current central node and processing continues in step 516. Otherwise processing continues in step 514. Stated differently, the connectivity of the central node to the potential branch node having smallest normalized variance value is considered. If the connectivity test volume between the central node and the potential branch node is empty, then one of the remaining neighboring nodes having the next smallest (i.e., having a larger normalized variance) normalized variance value (excluding the previously identified potential branch node) is chosen as the next potential branch node.

The process of checking the connectivity is repeated until either an appropriate neighboring node is determined to be a potential branch node with connectivity to the current central node or the current central node is assigned to be a root node because it is isolated in the IHS space from neighboring nodes. In step 514, it is determined whether there are additional neighboring nodes to evaluate as potential branch nodes. If there are additional neighboring nodes to evaluate, processing resumes in step 510 to select the neighboring node with the next smallest normalized variance as a potential branch node. Otherwise processing resumes at step 508, where the current central node is assigned to be a root node because it is isolated in the IHS space. In step 516 a tree-like structure is formed by connecting branch nodes to a root node through a series of predecessor branch nodes in the connecting-box structure, as is described further in connection with FIG. 12.

In step 518, it is determined whether there are any additional nodes to evaluate as potential root nodes. If there are additional nodes to evaluate, then processing continues in step 522, otherwise processing continues at step 520. In step 520, clusters are formed around each root node and all branch nodes with a path to that root node. More particularly, after the tree-like structures 412a and 412b (FIG. 12) are formed, boundaries between non-connected groups of nodes in the three-dimensional IHS color space can be determined (e.g., boundary 410 shown in two dimensions for clarity in FIG. 12). The boundaries define distinct clusters which include pixels having common characteristics in the three-dimensional IHS color space. Clustering is then completed in step 524. Each of these distinct clusters is assigned a unique label for further processing (step 144 of FIG. 2). It is understood that not every selected central node has twenty-six neighboring nodes. This is because when the central node in the three by three by three window is at a boundary of the connecting-box structure, the window contains less than twenty-seven nodes. When one of the connecting-boxes at the highest intensity level boundary of the connecting box structure, corresponding to node $384_{26}$ (FIG. 10), for example assuming the node $384_{26}$ is at a boundary, is selected as the central node, the central node has only seventeen adjacent neighboring nodes because nodes $384_9$–$384_{17}$ are not neighboring nodes.

In step 522, the window in IHS space is moved by a one connecting-box increment along one of either of the hue, intensity and saturation axes and processing resumes at step 504 to examine whether the recently selected central node within the window is a possible root node. The window is moved incrementally (in connecting box increments) through the entire IHS space in order to identify any additional root nodes. It should be noted that a root node cannot be combined with another root node, so each root node corresponds to one distinct cluster in the color space of the original image. It will be appreciated by those of ordinary skill in the art, that steps 504 through 516 can be implemented using other techniques to determine root nodes, branch nodes and branch directions.

Referring also to FIG. 12, exemplary tree-like structures 412a and 412b are shown in diagram 400 representing a portion of a connecting-box structure, which is of the type formed by the process of FIG. 11 from the connecting box structure 380 of FIG. 10. The diagram 400, shown for clarity in two dimensions instead of three dimensions, includes a plurality of nodes $402_{a1}$–$402_{f6}$ (generally referred to as nodes 402), a plurality of branches, or directional connections 406a–406n between nodes, and a cluster separation line 410. Some of the nodes 402 are classified as root nodes 404a, 404b and a portion of the remaining nodes are classified as branch nodes 408a–408m. The numbers within the circles representing nodes 402 are exemplary normalized variance values (scaled for clarity). The actual normalized variance values can vary from zero to large positive values. One set of nodes forms the tree-like structure 412a and a second set of nodes 402 forms the tree-like structure 412b, both of which are clusters in the color space. It should be noted that a node 402 corresponds to a connecting-box in the three-dimensional color space and can include a plurality of image pixels. In the two-dimensional example of FIG. 12, the connecting-box structure shown in diagram 400 includes six intervals (i.e. connecting-boxes) in the H and S spaces at a fixed intensity level. Each interval corresponds to a range of values in a connecting-box associated with a node 402.

An actual tree formation in the three-dimensional IHS color space includes nodes in three dimensions having branches directed towards the root nodes.

After root nodes 404a, 404b are identified in steps 506 and 508 (FIG. 11), the gradient value of the normalized variance of each remaining branch node 408 to its neighboring nodes is used to construct the series of branches 406 in such a way that paths are formed which reach one of the root nodes 404. Once all branch nodes 408 in IHS space are associated with their respective root node 404 (i.e., have a path defined to their respective root node), boundaries 410 are determined and each distinct tree-like structure 412a, 412b in the color space is defined by the boundaries.

A path is a series of branches 406 which connect a series of nodes 402 to a root node 404. Each branch 406 connects one node 402 to a branch node until reaching the root node 404. A branch node is an intermediate node 402 leading into a root node 404 along particular series of branches 406. The branch node, here node $402_{b2}$, connects node $402_{a1}$ to the root node 404a along a particular a series of branches 406a and 406b.

Normalized variance values computed in step 502 are used to construct series of branches 406 as paths in a steepest gradient descent direction to form the tree formations 412a and 412b. By following the series of branches 406 from each node 402, the set of paths that lead from each node 402 to the corresponding root node 404 according to the local minimum of normalized variance can be identified. Step 506 of the clustering process includes finding the branch directions for each node 402 by determining the steepest direction of the minimum of the normalized variance among the twenty-six neighboring nodes 402. Here for example, branch node $402_{b2}$ is a branch node of node $402_{a1}$. Root node 404a has a normalized variance of 3, node $402_{b2}$ has a normalized variance of 4, node $402_{a1}$ has a normalized variance of 6 and node $402_{a2}$ has a normalized variance of 8. Therefore the steepest path of descending normalized variance values from node $402_{a1}$ to the root node 404a is through branch node $402_{b2}$. After the root nodes 404 are determined, the disjoint groups of nodes 402 including root nodes 404 and branch nodes 408 are separated into the distinct clusters 412a, 412b along the corresponding cluster separation line 410 in step 508.

Figure 14:
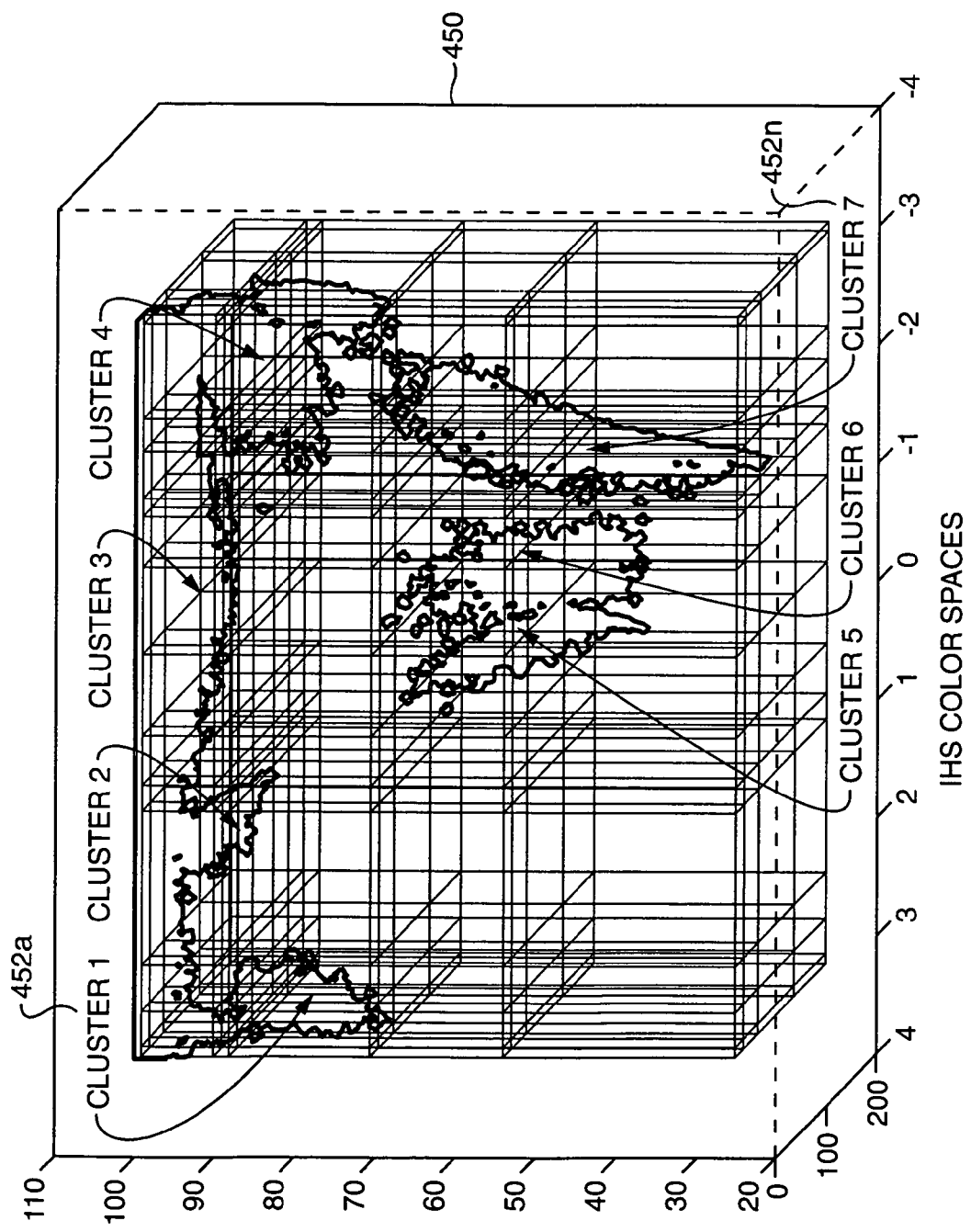
FIGS. 14 and 14A are perspective views of clusters formed according to the invention.
Figure 14A:
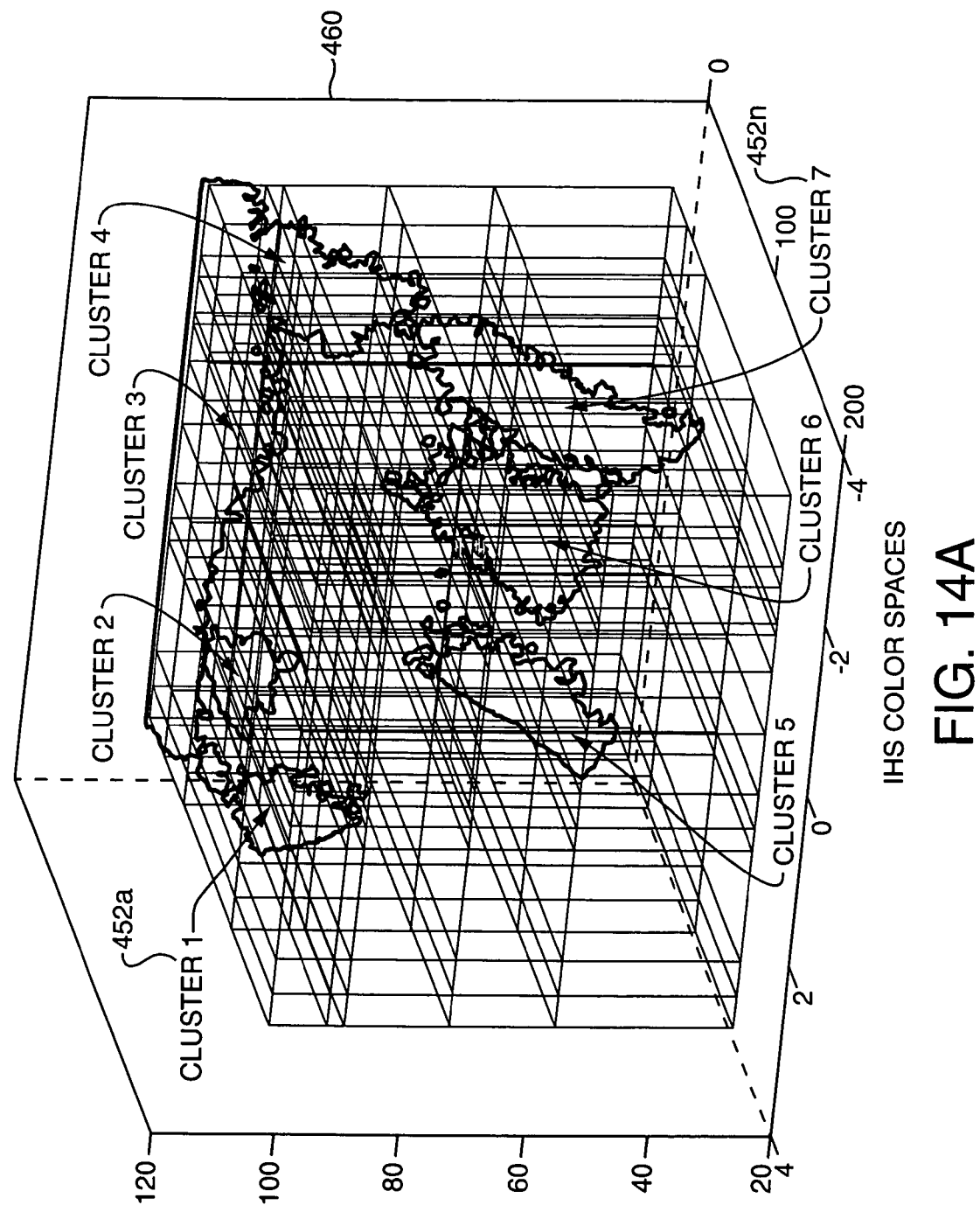

Now referring to FIGS. 14 and 14A, alternative perspective views 450 and 460, respectively show a plurality of clusters 452a–452n (generally referred to as cluster 452) formed by processing the image of FIG. 8 according to the segmentation process of FIGS. 1, 2, and 11. It should be noted that each cluster 452 may include more than one connecting-box and may be separated from adjacent clusters by volumes in the IHS space having no pixels.

Classification techniques, for example, neural networks using adaptive template matching (ATM), frequency-sensitive competitive learning (FSCL), rival-penalized competitive learning (RPCL) algorithms, and statistical classifiers are used to recognize objects in response to the tagged pixels. Neural network techniques including RPCL are described in G. A. Korn, Neural Networks and Fuzzy-Logic Control on Personal Computers and Workstations, The MIT Press, Cambridge, Mass., 1$^{st}$ edition, 1992. After step steps 144 and 146 (FIG. 1), the tagged pixels in three-dimensional IHS space are mapped back into the spatial domain on the original image to form segmented areas in the spatial domain. The segmented areas in the spatial domain are used as input parameters to the classifiers. Before the clusters 452 are used to classify the segmented areas into objects, the classifiers are trained using a series of training images with known objects located at known positions in the images. Once trained, the classifiers use actual images to classify a segmented area or groups of segmented areas of pixels in the spatial domain into objects which have previously been identified to the classifier through the training process. In one embodiment, RPCL requires only certain segmented areas of interest (e.g. having similar color characteristics of the objects which are to be recognized). The segmented areas of interest are obtained from tagged pixels in IHS space, and each segmented area is processed individually for classification as an object or a portion of an object.

Referring now to FIG. 15, an atomic force microscope (AFM) 600 having a signal processing and object recognition system 644 implementing the inventive segmenting technique includes a probe assembly 612 having a probe 614 mounted to the free end of a cantilever beam 616 (as shown as object 254 in FIG. 7). The probe 614 has a probe tip 618 (as shown as object 258 in FIG. 7) adapted to contact a sample surface 620 (as shown as object 257 in FIG. 7) of a sample 622 to be profiled. In this example, sample 622 is disposed on a sample holder 624 (as shown as object 256 in FIG. 7). It should be understood, however, that in other applications, sample 622 may be held by any fixture or surface. The AFM 600 further includes a signal processor and object recognition system 644 coupled to a detector 640 and a color camera 645.

The signal processor and object recognition system 644 includes a color space converter 644a operative to convert the acquired image into three-dimensional color space as described above in conjunction with step 102 of FIG. 2. A histogram generator 644b generates histograms in each of the dimensions of the three-dimensional color space according to step 104 of FIG. 2 and a histogram processor 644c accurately finds valleys in each of the histograms and projects these valleys into the three-dimensional color space according to step 106 (FIG. 2). Also provided in the signal processor and object recognition system 644 is a clustering processor 644d which implements the clustering process of FIG. 11 by which clusters are formed, corresponding to regions of the image having uniform characteristics. A classifier 644e is operative to group the clusters in order to recognize objects within the image. Use of the object recognition system 644 in the AFM 600 permits detection of the relative positions of the probe tip 618 and the sample surface 620.

In use, the probe assembly 612 and sample 622 are moved relative to one another, causing the probe tip 618 to move over the sample surface 620. Movement of the probe tip 618 over features including high aspect ratio structures 626 on the sample surface 620 causes the cantilever beam 616 to deflect. The deflection of the cantilever beam 616 is measured to provide a measure of the surface topography. More particularly, a laser beam 630 generated by a laser source 632 is directed towards, and reflects off a surface 616a of the cantilever beam 616. The reflected laser signal 631 impinges upon a sensor, or detector 640, which may, for example, be provided as a photo-detector array. In response to the reflected laser signal 631, the detector 640 generates an output signal 642 which is provided to the signal processor and object recognition system 644. It is important to accurately measure the alignment between the probe tip 618 and the sample surface 620 and the alignment must be measured for every sample.

In the alignment process, a color camera 645 provides a color image of the probe tip 618 and the sample surface 620 which is similar to the image of FIG. 7. The signal processor and object recognition system 644 processes the color image using the process described in the flow diagrams of FIGS. 1, 2 and 11 and additional object recognition steps, such as classification using a neural network, to detect the location of the sample 622 relative to the probe 614. In one embodiment, the sample holder 624 includes motorized x-y translation stages (not shown) and a z-axis motorized stage (not shown) for positioning the probe tip 618 relative to a feature of the sample 622 using alignment information generated by recognizing the relative positions of the probe tip 618 and the feature of the sample 622.

The signal processor and object recognition system 644 uses the alignment information and the output signal 642 to provide processed signals 646, portions of which correspond to feedback control signals 648 and portions of which correspond to the topographical sample image signals 650. The object recognition process is used for aligning the probe tip 618 with a specific region of sample 622. The object recognition process is not used for obtaining a topographical sample image. After obtaining a relatively precise location of the probe tip 618 and sample 622 in an x, y and z coordinate system as the result of the recognition process, a three-axis motorized stage is positioned to locate a specific region of the sample accurately below the probe tip 618. The image signals 650 are fed to a display 652 on which the sample topographical image and other images can be displayed, for example, an image from the color camera 645. A topographical sample view of the image can be viewed on a display 652. The display 652 is optional and the signal processor and object recognition system 644 operations are automated.

It should be appreciated the functions of the signal processor and object recognition system 644 can be provided by a separate processor, or by computer software instructions or groups of instructions executed on another processor which is part of the AFM. Such processing may be performed by a single processing apparatus which may, for example, be provided as part of microscope or measurement system. Alternatively, the processing steps of the signal processor and object recognition system 644 can be performed by functionally equivalent circuits such as a digital signal processor circuit or an application specific integrated circuit (ASIC).

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for segmenting a color image into a plurality of regions, comprising:
   converting the image to a three-dimensional color space;
   generating a histogram for each dimension in the color space;
   using the histogram for each dimension to generate a plurality of connecting-boxes in the three-dimensional color space; and
   computing a normalized variance value of each connecting-box in order to form clusters of connecting-boxes, each cluster corresponding to a respective region of the image in the three-dimensional color space.

2. The method of claim 1 wherein the histogram is a one-dimensional histogram.

3. The method of claim 1 wherein at least two of the plurality of connecting-boxes have different sizes.

4. The method of claim 1 wherein the computing step includes combining each of the plurality of connecting-boxes with a neighboring connecting-box on a path that has a local minimum normalized variance value in a steepest gradient descent direction.

5. The method of claim 1 wherein the histogram using step includes detecting a valley in each histogram, wherein each connecting-box is associated with a respective valley in the histogram.

6. The method of claim 5 wherein the valley detecting step comprises filtering the histogram to remove high frequency noise.

7. The method of claim 1 wherein the color space is a perceptually uniform color space.

8. The method of claim 7 wherein the perceptually uniform color space is an intensity hue saturation (I H S) color space.

9. The method of claim 1 further comprising the step of filtering the color image with an edge-preserving filter.

10. The method of claim 1 further comprising the step of filtering each of the histograms image with a morphological filter.

11. The method of claim 10 wherein the morphological filter comprises a raised triangular structuring element.

12. The method of claim 1 wherein forming clusters of connecting-boxes further comprises:
    grouping the plurality of connecting-boxes by determining a plurality of root nodes corresponding to the plurality of connecting-boxes having a local minimum normalized variance; and
    determining the branch direction from each connecting-box to a corresponding one of the plurality of root nodes by determining the steepest gradient direction of the minimum of the normalized variance.

13. The method of claim 1 further comprising labeling each pixel in said image to correspond to one of the clusters.

14. The method of claim 13 further comprising classifying said clusters to identify objects in said image, said classifying step comprising:
    training a classifier with images of a plurality of objects to be recognized; and
    recognizing ones of the plurality of objects to be recognized using the labeled pixels.

15. The method of claim 1 wherein the color image is of a probe and a sample, and said method further comprises:
    classifying the clusters of connecting-boxes into objects comprising the probe and the sample; and
    detecting a position of the probe relative to the sample.

16. An object recognition system for segmenting a color image into a plurality of regions, said system comprising:
    a color space converter operative to convert the image to a three-dimensional color space;
    a histogram generator operative to generate a histogram for each dimension in said three-dimensional color space;
    a histogram processor responsive to the histogram for each dimension to generate a plurality of connecting-boxes in the three-dimensional color space; and
    a clustering processor operative to compute the normalized variance value of each connecting-box in order to form clusters of connecting-boxes, each cluster corresponding to a respective region of the image in the three-dimensional color space.

17. The object recognition system of claim 16 further comprising a classifier responsive to said clusters of connecting-boxes for classifying said clusters to recognize objects in said image.

18. The object recognition system of claim 16 wherein said objects in said image comprise a probe and a sample.

* * * * *

UNITED STATES PATENT AND TRADEMARK OFFICE
CERTIFICATE OF CORRECTION

| | |
|---|---|
| PATENT NO. | : 7,020,329 B2 |
| APPLICATION NO. | : 10/231968 |
| DATED | : March 28, 2006 |
| INVENTOR(S) | : Prempraneerach et al. |

It is certified that error appears in the above-identified patent and that said Letters Patent is hereby corrected as shown below:

Column 5, lines 2-3, delete "such as color video camera," and replace with --such as a color video camera,--.

Column 9, line 66, delete "the effect the opening" and replace with --the effect of the opening--.

Column 12, line 4, delete "axis I366." and replace with --axis I 366.--.

Column 12, line 13, delete "there are total" and replace with --there are a total--.

Column 12, lines 47-48, delete "A set intersecting" and replace with --A set of intersecting--.

Column 12, line 66, delete "H, I and S histogram" and replace with --H, I and S histograms--.

Column 13, line 1, delete "connecting boxes" and replace with --connecting-boxes--.

Column 13, lines 30-31, delete "form a tree-like structures 412a and 412b (FIG. 12)." and replace with --form tree-like structures 412a and 412b (FIG. 12).--

Column 14, line 52, delete "among each the current" and replace with --among each of the current--.

Column 15, line 10, delete "whether is there" and replace with --whether there is--.

Column 15, line 23, delete "thickness of the each box" and replace with --thickness of each box--.

Column 16, line 46, delete "connecting box" and replace with --connecting-box--.

UNITED STATES PATENT AND TRADEMARK OFFICE
CERTIFICATE OF CORRECTION

PATENT NO. : 7,020,329 B2
APPLICATION NO. : 10/231968
DATED : March 28, 2006
INVENTOR(S) : Prempraneerach et al.

It is certified that error appears in the above-identified patent and that said Letters Patent is hereby corrected as shown below:

Column 17, line 18, delete "along particular" and replace with --along a particular--.

Column 19, line 31, delete "be appreciated the functions" and replace with --be appreciated that the functions--.

Column 19, line 37, delete "as part of microscope" and replace with --as part of a microscope--.

Signed and Sealed this

Fifteenth Day of August, 2006

JON W. DUDAS
*Director of the United States Patent and Trademark Office*